(12) United States Patent
Ode et al.

(10) Patent No.: US 11,882,492 B2
(45) Date of Patent: Jan. 23, 2024

(54) COMMUNICATION DEVICE, COMMUNICATION METHOD, COMMUNICATION CONTROL DEVICE, AND BASE STATION DEVICE

(71) Applicant: FUJITSU LIMITED, Kawasaki (JP)

(72) Inventors: Takayoshi Ode, Yokohama (JP); Tetsuya Hasegawa, Setagaya (JP); Yoshihiro Kawasaki, Kawasaki (JP); Yoshiaki Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 437 days.

(21) Appl. No.: 17/321,912

(22) Filed: May 17, 2021

(65) Prior Publication Data
US 2021/0274406 A1 Sep. 2, 2021

Related U.S. Application Data

(63) Continuation of application No. PCT/JP2018/045003, filed on Dec. 6, 2018.

(51) Int. Cl.
*H04W 36/08* (2009.01)
*H04W 36/00* (2009.01)
*H04W 36/30* (2009.01)

(52) U.S. Cl.
CPC ....... *H04W 36/08* (2013.01); *H04W 36/0058* (2018.08); *H04W 36/00837* (2018.08); *H04W 36/30* (2013.01)

(58) Field of Classification Search
CPC ............. H04W 36/08; H04W 36/0058; H04W 36/00837; H04W 36/30; H04W 36/0085;
(Continued)

(56) References Cited

U.S. PATENT DOCUMENTS 11,343,720 B2 * 5/2022 Thomas ........ H04W 36/008375
11,477,710 B2 * 10/2022 Xing ................... H04B 7/0632
(Continued)

FOREIGN PATENT DOCUMENTS

JP 2011-239098 A 11/2011
JP 2017-505023 A 2/2017
(Continued)

OTHER PUBLICATIONS

3GPP TS 23.501 V15.3.0, "3rd Generation Partnership Project; Technical Specification Group Services and System Aspects; System Architecture for the 5G System; Stage 2 (Release 15)", Sep. 2018.
(Continued)

*Primary Examiner* — Julio R Perez
(74) *Attorney, Agent, or Firm* — Myers Wolin, LLC

(57) ABSTRACT

A communication device that performs wireless communication with a terminal device, the communication device includes a receiver, a processor, and a transmitter. The receiver configured to receive a measurement request from a wireless communication control device which controls communication between the communication device and the terminal device. The processor configured to measure uplink wireless channel quality with the terminal device. The transmitter configured to transmit a result of the measurement to the wireless communication control device. The receiver receives control information related to the measurement of the uplink wireless channel quality from the wireless communication control device or another communication device.

13 Claims, 12 Drawing Sheets

(58) Field of Classification Search
CPC ... H04W 88/085; H04W 24/04; H04W 24/10; H04W 36/06

See application file for complete search history.

(56) References Cited

U.S. PATENT DOCUMENTS

| | | | | |
|---|---|---|---|---|
| 2016/0285602 | A1* | 9/2016 | Fang | H04L 5/0032 |
| 2018/0270728 | A1 | 9/2018 | Van Oost et al. | |
| 2019/0208448 | A1* | 7/2019 | Peng | H04W 36/38 |
| 2022/0311553 | A1* | 9/2022 | Shimoda | H04L 5/0007 |
| 2023/0080714 | A1* | 3/2023 | Pelletier | H04W 74/0833 |
| | | | | 370/254 |
| 2023/0132757 | A1* | 5/2023 | Kang | H04W 16/28 |
| | | | | 370/329 |
| 2023/0300648 | A1* | 9/2023 | Wangler | H04W 24/08 |
| | | | | 370/252 |

FOREIGN PATENT DOCUMENTS

| | | |
|---|---|---|
| JP | 2018-504029 A | 2/2018 |
| JP | 2018-56687 A | 4/2018 |
| JP | 2018-160899 A | 10/2018 |
| WO | 2013/025558 A1 | 2/2013 |

OTHER PUBLICATIONS

3GPP TS 36.211 V15.2.0, "3rd Generation Partnership Project; Technical Specification Group Radio Access Network; Evolved Universal Terrestrial Radio Access (E-UTRA); Physical channels and modulation (Release 15)", Jun. 2018.

3GPP TS 36.212 V15.2.1, "3rd Generation Partnership Project; Technical Specification Group Radio Access Network; Evolved Universal Terrestrial Radio Access (E-UTRA); Multiplexing and channel coding (Release 15)", Jul. 2018.

3GPP TS 36.213 V15.2.0, "3rd Generation Partnership Project; Technical Specification Group Radio Access Network; Evolved Universal Terrestrial Radio Access (E-UTRA); Physical layer procedures (Release 15)", Jun. 2018.

3GPP TS 36.300 V15.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Jun. 2018.

3GPP TS 36.321 V15.2.0, "3rd Generation Partnership Project; Technical Specification Group Radio Access Network; Evolved Universal Terrestrial Radio Access (E-UTRA); Medium Access Control (MAC) protocol specification (Release 15)", Jul. 2018.

3GPP TS 36.322 V15.1.0, "3rd Generation Partnership Project; Technical Specification Group Radio Access Network; Evolved Universal Terrestrial Radio Access (E-UTRA); Radio Link Control (RLC) protocol specification (Release 15)", Jul. 2018.

3GPP TS 36.323 V15.0.0, "3rd Generation Partnership Project; Technical Specification Group Radio Access Network; Evolved Universal Terrestrial Radio Access (E-UTRA); Packet Data Convergence Protocol (PDCP) specification (Release 15)", Jul. 2018.

3GPP TS 36.331 V15.2.2, "3rd Generation Partnership Project; Technical Specification Group Radio Access Network; Evolved Universal Terrestrial Radio Access (E-UTRA); Radio Resource Control (RRC); Protocol specification (Release 15)", Jun. 2018.

3GPP TS 36.413 V15.2.0, "3rd Generation Partnership Project; Technical Specification Group Radio Access Network; Evolved Universal Terrestrial Radio Access Network (E-UTRAN); S1 Application Protocol (S1AP) (Release 15)", Jun. 2018.

3GPP TS 36.423 V15.2.0, "3rd Generation Partnership Project; Technical Specification Group Radio Access Network; Evolved Universal Terrestrial Radio Access Network (E-UTRAN); X2 application protocol (X2AP) (Release 15)", Jun. 2018.

3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.

3GPP TS 37.340 V15.2.0, "3rd Generation Partnership Project; Technical Specification Group Radio Access Network; Evolved Universal Terrestrial Radio Access (E-UTRA) and NR; Multi-connectivity; Stage 2 (Release 15)", Jun. 2018.

3GPP TS 38.201 V15.0.0, "3rd Generation Partnership Project; Technical Specification Group Radio Access Network; NR; Physical layer; General description (Release 15)", Dec. 2017.

3GPP TS 38.202 V15.2.0, "3rd Generation Partnership Project; Technical Specification Group Radio Access Network; NR; Services provided by the physical layer (Release 15)", Jun. 2018.

3GPP TS 38.211 V15.2.0, "3rd Generation Partnership Project; Technical Specification Group Radio Access Network; NR; Physical channels and modulation (Release 15)", Jun. 2018.

3GPP TS 38.212 V15.2.0, "3rd Generation Partnership Project; Technical Specification Group Radio Access Network; NR; Multiplexing and channel coding (Release 15)", Jun. 2018.

3GPP TS 38.213 V15.2.0, "3rd Generation Partnership Project; Technical Specification Group Radio Access Network; NR; Physical layer procedures for control (Release 15)", Jun. 2018.

3GPP TS 38.214 V15.2.0, "3rd Generation Partnership Project; Technical Specification Group Radio Access Network; NR; Physical layer procedures for data (Release 15)", Jun. 2018.

3GPP TS 38.215 V15.2.0, "3rd Generation Partnership Project; Technical Specification Group Radio Access Network; NR; Physical layer measurements (Release 15)", Jun. 2018.

3GPP TS 38.300 V15.2.0, "3rd Generation Partnership Project; Technical Specification Group Radio Access Network; Nr; Nr and NG-RAN Overall Description; Stage 2 (Release 15)", Jun. 2018.

3GPP TS 38.321 V15.2.0, "3rd Generation Partnership Project; Technical Specification Group Radio Access Network; NR; Medium Access Control (MAC) protocol specification (Release 15)", Jun. 2018.

3GPP TS 38.322 V15.2.0, "3rd Generation Partnership Project; Technical Specification Group Radio Access Network; NR; Radio Link Control (RLC) protocol specification (Release 15)", Jun. 2018.

3GPP TS 38.323 V15.2.0, "3rd Generation Partnership Project; Technical Specification Group Radio Access Network; NR; Packet Data Convergence Protocol (PDCP) specification (Release 15)", Jun. 2018.

3GPP TS 38.331 V15.2.1, "3rd Generation Partnership Project; Technical Specification Group Radio Access Network; NR; Radio Resource Control (RRC) protocol specification (Release 15)", Jun. 2018.

3GPP TS 38.401 V15.2.0, "3rd Generation Partnership Project; Technical Specification Group Radio Access Network; NG-RAN; Architecture description (Release 15)", Jun. 2018.

3GPP TS 38.410 V15.0.0, "3rd Generation Partnership Project; Technical Specification Group Radio Access Network; NG-RAN; NG general aspects and principles (Release 15)", Jun. 2018.

3GPP TS 38.413 V15.0.0, "3rd Generation Partnership Project; Technical Specification Group Radio Access Network; NG-RAN; NG Application Protocol (NGAP) (Release 15)", Jun. 2018.

3GPP TS 38.420 V15.0.0, "3rd Generation Partnership Project; Technical Specification Group Radio Access Network; NG-RAN; Xn general aspects and principles (Release 15)", Jun. 2018.

BGPP TS 38.423 V15.0.0, "3rd Generation Partnership Project; Technical Specification Group Radio Access Network; NG-RAN; Xn application protocol (XnAP) (Release 15)", Jun. 2018.

3GPP TS 38.470 V15.2.0, "3rd Generation Partnership Project; Technical Specification Group Radio Access Network; NG-RAN; F1 general aspects and principles (Release 15)", Jun. 2018.

3GPP TS 38.473 V15.2.1, "3rd Generation Partnership Project; Technical Specification Group Radio Access Network; NG-RAN; F1 application protocol (F1AP) (Release 15)", Jul. 2018.

3GPP TR 38.801 V14.0.0, "3rd Generation Partnership Project; Technical Specification Group Radio Access Network; Study on new radio access technology: Radio access architecture and interfaces (Release 14)", Mar. 2017.

(56) References Cited

OTHER PUBLICATIONS

3GPP TR 38.802 V14.2.0, "3rd Generation Partnership Project; Technical Specification Group Radio Access Network; Study on New Radio Access Technology Physical Layer Aspects (Release 14)", Sep. 2017.

3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.

3GPP TR 38.900 V15.0.0, "3rd Generation Partnership Project; Technical Specification Group Radio Access Network; Study on channel model for frequency spectrum above 6 GHZ (Release 15)", Jun. 2018.

3GPP TR 38.912 V15.0.0, "3rd Generation Partnership Project; Technical Specification Group Radio Access Network; Study on New Radio (NR) access technology (Release 15)", Jun. 2018.

3GPP TR 38.913 V15.0.0, "3rd Generation Partnership Project; Technical Specification Group Radio Access Network; Study on Scenarios and Requirements for Next Generation Access Technologies; (Release 15)", Jun. 2018.

ZTE, "TP for gNB-DU measurement report", Agenda Item: 10.11.3, 3GPP TSG-RAN WG3 Meeting #96, R3-171663, Hangzhou, P. R. China, May 15-19, 2017.

International Search Report and Written Opinion of the International Searching Authority issued by the Japan Patent Office for corresponding International Patent Application No. PCT/JP2018/045003, dated Jan. 15, 2019, with an English translation.

Notice of Reasons for Refusal issued by the Japan Patent Office for corresponding Japanese Patent Application No. 2020-558771, dated Apr. 12, 2022, with an English translation.

* cited by examiner

COMMUNICATION DEVICE, COMMUNICATION METHOD, COMMUNICATION CONTROL DEVICE, AND BASE STATION DEVICE

CROSS-REFERENCE TO RELATED APPLICATION

This application is a continuation application of International Application PCT/W2018/045003 filed on Dec. 6, 2018 and designated the U.S., the entire contents of which are incorporated herein by reference.

FIELD

The embodiments discussed herein are related to a communication device, a communication method, a communication control device, a base station device, and a terminal device.

BACKGROUND

In recent years, a base station device provided in a wireless communication system has been separated into a communication device such as a base band unit (BBU), for example, and a wireless communication device such as a remote radio head (RRH), for example. In addition, there has been a case where the communication device and the wireless communication device are connected by an interface such as a common public radio interface (CPRI), for example. Furthermore, in a fifth generation (5G) wireless communication system under study based on the third generation partnership project (3GPP), separating into a central unit (CU), which is a communication control device that controls a base station device, and a distributed unit (DU), which is a communication device that wirelessly transmits and receives signals, and connecting the CU and the DU with an F1 interface using a stream control transmission protocol (SCTP), a GPRS-tunneling protocol (GTP-U), and the like having protocols different from the CPRI have been studied.

By separating the functions of the base station device in this manner, it becomes possible to construct a wireless communication system that covers a vast area at low cost by, for example, connecting a plurality of DUs to one CU and disposing the CUs and DUs in a distributed manner. Note that one CU and one DU may satisfy the functions of a conventional base station device.

Meanwhile, the functions of the base station device generally include processing of a packet data convergence protocol (PDCP) layer, a radio link control (RLC) layer, a media access control (MAC) layer, and a physical layer in order from the upper layer. In addition, in the fifth generation (5G) wireless communication system, it has been discussed to introduce the processing of a service data adaptation protocol (SDAP) layer, which is the upper layer of the PDCP layer, into the function of a user plane (U-plane). Note that the BBU includes the above-described PDCP, RLC, MAC, and a baseband processing unit, and the RRH includes an amplifier.

At the time of separating the functions of the base station device into the CU and the DU, high layer split (HLS) that separates between the PDCP layer and the RLC layer, and low layer split (LLS) that separates between the MAC layer and the physical layer or divides the physical layer into two have been studied.

Japanese National Publication of International Patent Application No. 2018-504029, 3GPP TS 23.501 V15.3.0 (2018-09), 3GPP TS 36.211 V15.2.0 (2018-06), 3GPP TS 36.212 V15.2.1 (2018-07), 3GPP TS 36.213 V15.2.0 (2018-06), 3GPP TS 36.300 V15.2.0 (2018-06), 3GPP TS 36.321 V15.2.0 (2018-07), 3GPP TS 36.322 V15.1.0 (2018-07), 3GPP TS 36.323 V15.0.0 (2018-07), 3GPP TS 36.331 V15.2.2 (2018-06), 3GPP TS 36.413 V15.2.0 (2018-06), 3GPP TS 36.423 V15.2.0 (2018-06), 3GPP TS 36.425 V15.0.0 (2018-06), 3GPP TS 37.340 V15.2.0 (2018-06), 3GPP TS 38.201 V15.0.0 (2017-12), 3GPP TS 38.202 V15.2.0 (2018-06), 3GPP TS 38.211 V15.2.0 (2018-06), 3GPP TS 38.212 V15.2.0 (2018-06), 3GPP TS 38.213 V15.2.0 (2018-06), 3GPP TS 38.214 V15.2.0 (2018-06), 3GPP TS 38.215 V15.2.0 (2018-06), 3GPP TS 38.300 V15.2.0 (2018-06), 3GPP TS 38.321 V15.2.0 (2018-06), 3GPP TS 38.322 V15.2.0 (2018-06), 3GPP TS 38.323 V15.2.0 (2018-06), 3GPP TS 38.331 V15.2.1 (2018-06), 3GPP TS 38.401 V15.2.0 (2018-06), 3GPP TS 38.410 V15.0.0 (2018-06), 3GPP TS 38.413 V15.0.0 (2018-06), 3GPP TS 38.420 V15.0.0 (2018-06), 3GPP TS 38.423 V15.0.0 (2018-06), 3GPP TS 38.470 V15.2.0 (2018-06), 3GPP TS 38.473 V15.2.1 (2018-07), 3GPP TR 38.801 V14.0.0 (2017-03), 3GPP TR 38.802 V14.2.0 (2017-09), 3GPP TR 38.803 V14.2.0 (2017-09), 3GPP TR 38.804 V14.0.0 (2017-03), 3GPP TR 38.900 V15.0.0 (2018-06), 3GPP TR 38.912 V15.0.0 (2018-06), and 3GPP TR 38.913 V15.0.0 (2018-06) are disclosed as related art.

SUMMARY

According to an aspect of the embodiments, a communication device that performs wireless communication with a terminal device, the communication device includes: a receiver configured to receive a measurement request from a wireless communication control device which controls communication between the communication device and the terminal device; a processor configured to measure uplink wireless channel quality with the terminal device; and a transmitter configured to transmit a result of the measurement to the wireless communication control device, wherein the receiver receives control information related to the measurement of the uplink wireless channel quality from the wireless communication control device or another communication device.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Since DUs under the same CU have the same cell ID that identifies the cell corresponding to the CU, a reference signal (RS, pilot) and a synchronization signal generated using the cell ID transmitted from the DU are the same signal (or signal string). A UE executes hand over (HO) on the basis of the wireless channel quality measured for each cell ID.

However, although the UE is capable of measuring the wireless channel quality in units of cells, it is not capable of measuring the wireless channel quality in units of DUs, that is, for example, a state of a wireless channel for each communication device. As a result, the UE is not capable of executing path switching between DUs to connect with a DU having better wireless channel quality on the basis of the state of the wireless channel for each DU.

One aspect is to provide a communication device and the like capable of measuring a state of a wireless channel for each DU in DUs having the same cell ID.

Hereinafter, embodiments will be described in detail with reference to the accompanying drawings. Problems and embodiments in the present specification are merely examples, and do not limit the scope of rights of the present application. For example, as long as the described expressions are technologically equivalent even if different described expressions are used, the technologies of the present application may be applied and the scope of rights is not limited thereby. In addition, each of the embodiments may be suitably combined within a range that does not cause contradiction between individual processing.

Furthermore, it is also permissible if, as the used terms and the described technical contents in the present specification, terms and technical contents described in specifications and contributions as standards related to communication such as 3GPP are appropriately used.

Hereinafter, embodiments of a communication device, a communication method, a communication control device, a base station device, and a terminal device disclosed in the present application will be described in detail with reference to the accompanying drawings. Note that the following embodiments do not limit the disclosed'technology.

First Embodiment

Figure 1A:
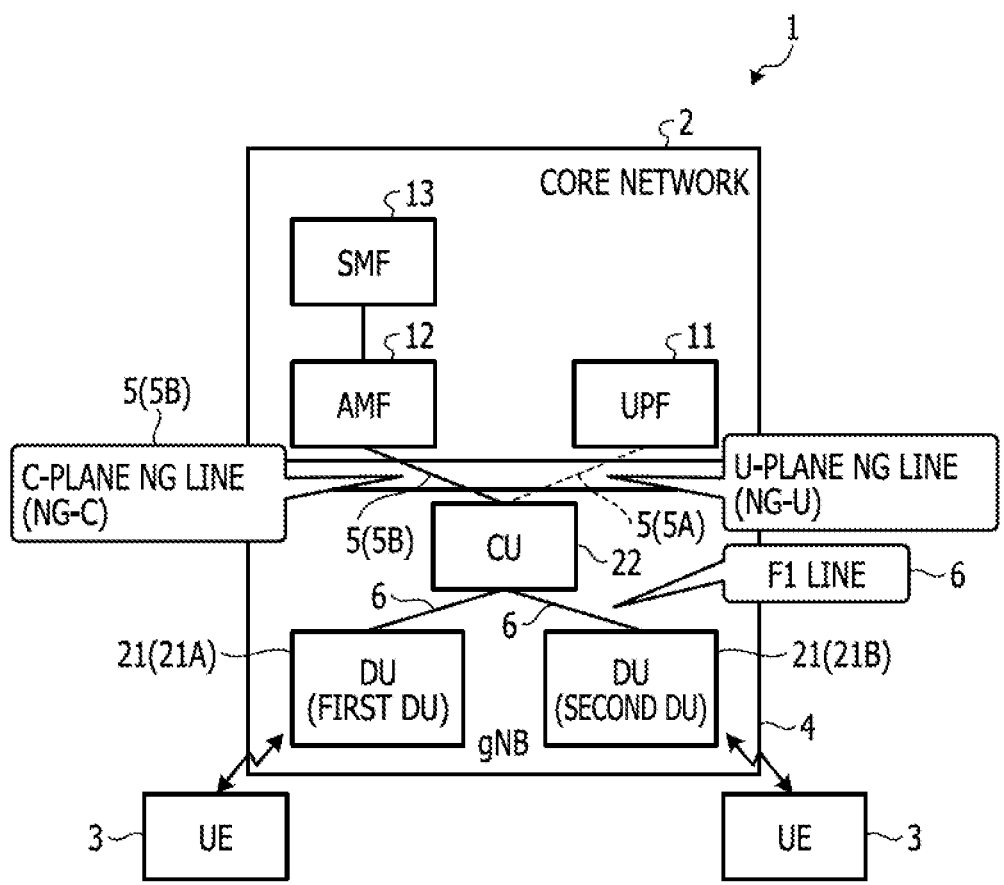
FIG. 1A is an explanatory diagram illustrating an exemplary wireless communication system according to a first embodiment.

FIG. 1A is a diagram illustrating an exemplary wireless communication system 1 according to a first embodiment. The wireless communication system 1 illustrated in FIG. 1A includes a core network 2, a terminal device (e.g., also referred to as a user equipment (UE)) 3 such as a smartphone or a tablet, and, for example, g Node B (gNB) 4, which is a base station device that wirelessly communicates with the UE 3.

The core network 2 includes a user plane function (UPF) 11, which is a server (gateway) that transmits user data, an access and mobility management function (AMF) 12, which is a server that performs control related to wireless connection of the UE 3 and movement of the UE 3, and a session management function (SMF) 13, which is a server that controls connection with the UE 3. The UPF 11 is a device that controls a user plane, and executes routing and transfer of user data. The AMF 12 is a device that controls a control plane, and terminates the control plane in a radio access network (RAN). The SMF 13 is a device that manages sessions (connections). Note that the user plane is an area for processing user data, and the control plane is an area for processing control information. Therefore, the UPF 11 is a device that controls transmission of user data, and the AMF 12 is a device that controls communication and controls transmission of control information. The UPF 11, the AMF 12, and the SMF 13 are described in Non-Patent Documents 1 to 39 and the like mentioned above.

Figure 1B:
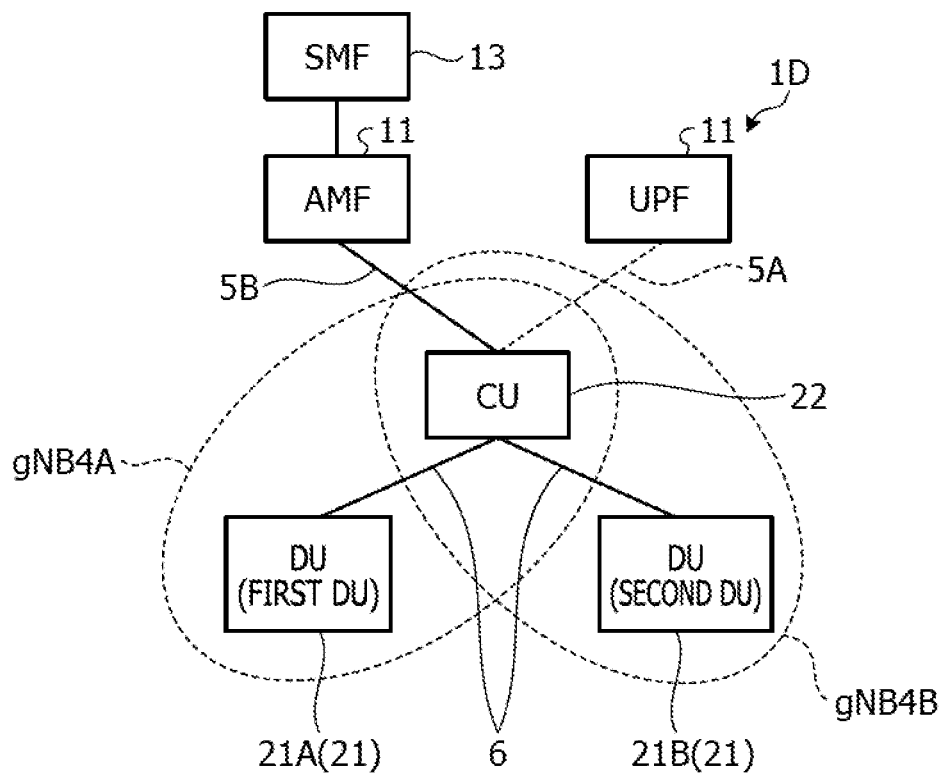
FIG. 1B is an explanatory diagram illustrating an exemplary wireless communication system according to another example.

The gNB 4 includes a distributed unit (DU) 21, and a central unit (CU) 22 that controls the DU 21. Note that the gNB 4 is a type of high layer split (HLS) that separates between a PDCP layer and an RLC layer at the time of separating the CU 22 and the DU 21. The DU 21 under the CU 22 has a cell ID same as that of the CU 22. The DU 21 under the CU 22 is assumed to be a first DU 21A and a second DU 21B. Note that the first DU 21A and the second DU 21B are assumed to be disposed at geographically different places, for example. One CU 22 and one DU 21 may satisfy the functions of the gNB 4. Note that, although the wireless communication system 1 illustrated in FIG. 1A has been exemplified for convenience of explanation, the present embodiment may also be applied to a wireless communication system 1D illustrated in FIG. 1B. Note that configurations same as those of the wireless communication system 1 illustrated in FIG. 1A are denoted by the same reference signs to omit descriptions of overlapping configurations and operations thereof. As illustrated in FIG. 1B, it is also permissible if one CU 22 and one first DU 21A constitute a base station gNB (4A), and the same one CU 22 and one second DU 21B constitute another base station gNB (4B).

The CU 22 connects with the UPF 11 and the AMF 12 via an NG line 5. The CU 22 connects with the UPF 11 via an NG line 5A for the user plane (U-plane NG line (NG-U)). The CU 22 connects with the AMF 12 via an NG line 5B for the control plane (C-plane NG line (NG-C)). Moreover, the CU 22 connects with the first DU 21A and the second DU 21B in the DU 21 via an F1 line 6. The F1 line 6 is a line of an F1 interface (see TS38.470, T538.471, T538.472, T538.473, TS38.474, and TS38.475). Furthermore, the CU 22 connects with a CU 22 in another gNB 4 via an Xn line 7 (see FIG. 2). The Xn line 7 is a line of an Xn interface.

Figure 2:
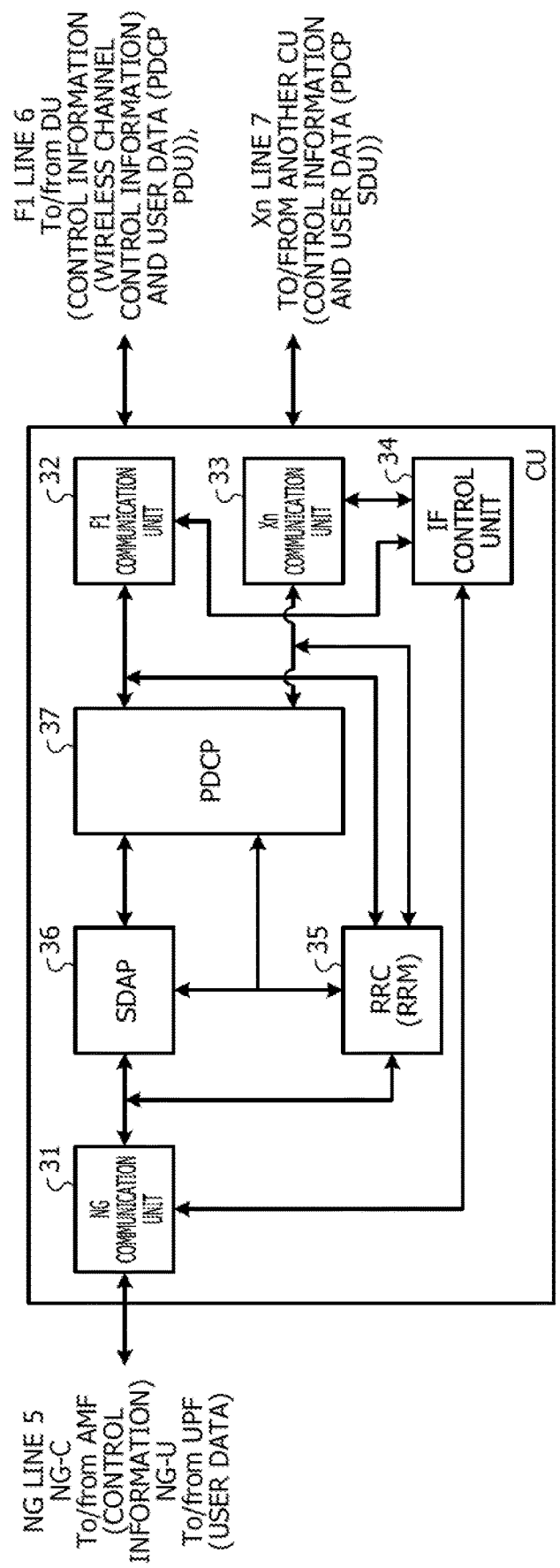
FIG. 2 is a block diagram illustrating an exemplary configuration of a CU in gNB.

FIG. 2 is a block diagram illustrating an exemplary configuration of the CU 22 in the gNB 4. The CU 22 illustrated in FIG. 2 includes an NG communication unit (or NG interface) 31, an F1 communication unit (or F1 interface) 32, an Xn communication unit (or Xn interface) 33, an IF control unit (or interface controller) 34, and a radio resource controller (RRC) 35. The CU 22 includes a service data adaptation protocol (SDAP) 36, and a packet data convergence protocol (PDCP) 37. The NG communication unit 31 is a communication IF that connects with the AMF 12 and the UPF 11 in the core network 2 using the NG line 5. The NG communication unit 31 uses the NG line 5 to communicate, transmit and receive, or transfer control information with the AMF 12, and also uses the NG line 5 to communicate (transmit and receive, or transfer) user data with the UPF 11. The F1 communication unit 32 is a communication IF that connects with the DU 21 in the gNB 4 using the F1 line 6. The F1 communication unit 32 uses the F1 line 6 to communicate (transmit and receive, or transfer) control information and user data with the DU 21. The user data to be transmitted via the F1 line 6 includes, for example, a PDCP protocol data unit (PDU). The Xn communication unit 33 is a communication IF that connects with another CU 22 using the Xn line 7. The Xn line 7 uses the SCTP or the like to transmit, to the another CU 22, control signals of the control plane, and also uses the GTP-U or the like to transmit user data of the user plane. The Xn communication unit 33 uses the Xn line 7 to communicate (transmit and receive, or transfer) control information and user data with the another CU 22. Note that the user data to be transmitted via the Xn line 7 includes, for example, a PDCP service data unit (SDU).

The IF control unit 34 controls the NG communication unit 31, the F1 communication unit 32, and the Xn communication unit 33. The IF control unit 34 executes, for example, control such as a setup, addition, modification, and deletion (release) of the line (NG-C) 5B with the AMF 12, and control such as a setup, addition, modification, and deletion of the line (NG-U) 5A with the UPF 11. Furthermore, the IF control unit 34 executes control such as a setup, addition, modification, and deletion of the line (F1, or F1-C and F1-U) 6 with the DU 21, and control such as a setup, addition, modification, and deletion of the line (Xn, or Xn-C and Xn-U) 7 with the another CU 22. Note that it is also permissible if control of NG, F1, and Xn is performed by separate IF control units. The RRC 35 implements radio resource management (RRM) to manage or control line connection between the gNB 4 and the UE 3, measurement of wireless channel quality, and wireless network resources (see TS38.331). The SDAP 36 executes, for example, processing of an SDAP layer that controls quality of service (QoS) of data or user data in units of flows or performs control to satisfy regulations such as a transmission speed, a maximum transmission delay, and transmission quality of data or user data (see T537.324). The PDCP 37 executes, for example, processing of a PDCP layer such as data ordering, header compression, and encryption (see TS38.323).

The F1 communication unit 32 notifies the DU 21 of control information such as a measurement request of uplink wireless channel quality using the F1 line 6. The F1 communication unit 32 receives control information such as a measurement result of the wireless channel quality in response to the measurement request notified from the DU 21 using the F1 line 6. The RRC 35 generates control information for individual terminals or common to terminals for switching a wireless connection or a path (wireless channel) with the UE 3 between subordinate DUs 21. The F1 communication unit 32 notifies the subordinate DUs 21 of the control information for individual terminals or common to terminals such as path switching (wireless channel switching and wireless connection switching) using the F1 line 6.

Figure 3:
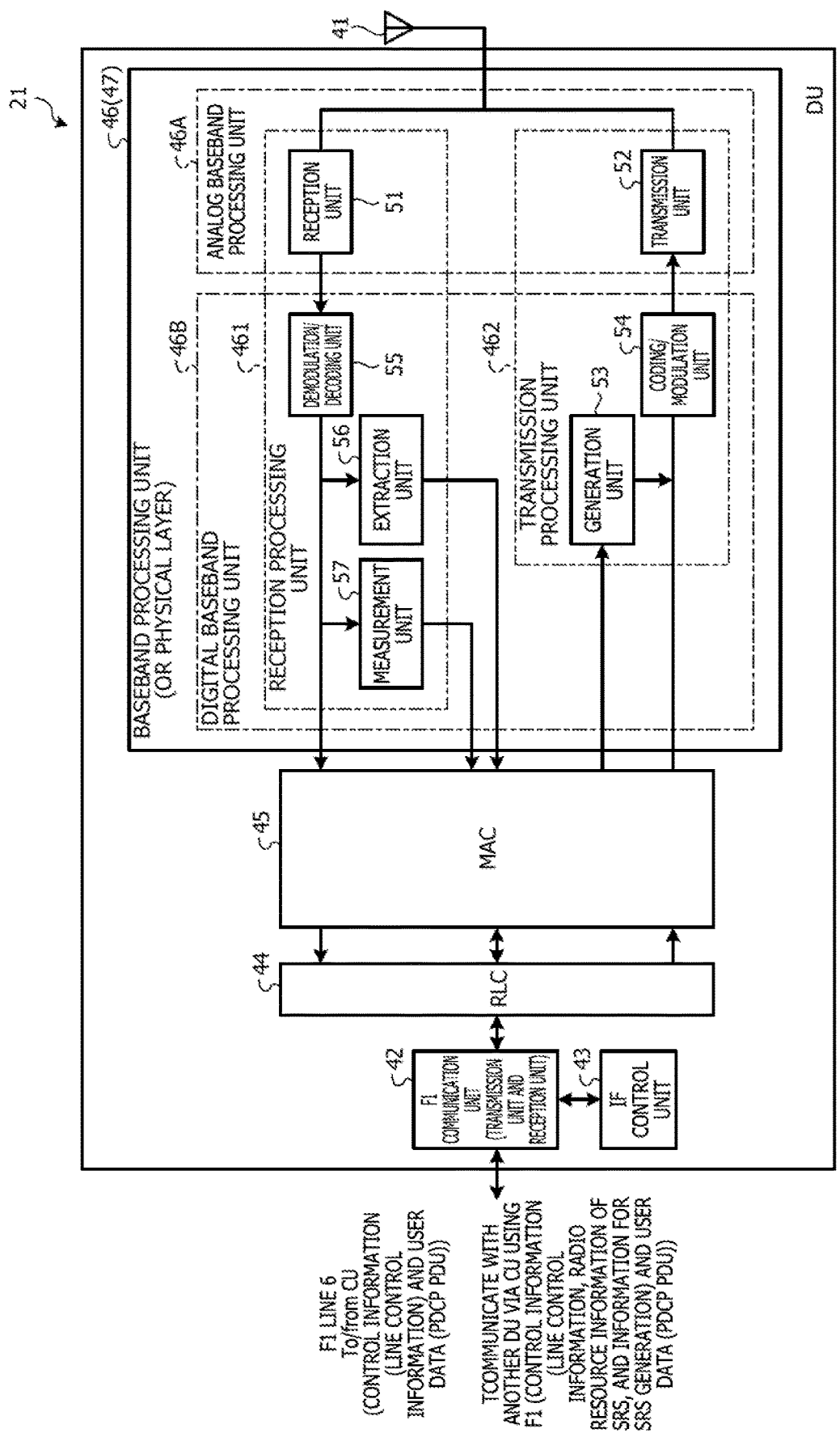
FIG. 3 is a block diagram illustrating an exemplary configuration of a DU in the gNB.

FIG. 3 is a block diagram illustrating an exemplary configuration of the DU 21 in the gNB 4. The DU 21 in the gNB 4 illustrated in FIG. 3 includes an antenna 41, an F1 communication unit 42, an IF control unit 43, a radio link control (RLC) 44, a medium access control (MAC) 45, a baseband processing unit 46, and a physical layer 47. The antenna 41 is a wireless antenna that wirelessly communicates with the UE 3 using a wireless channel. The F1 communication unit 42 is a communication IF that connects with the CU 22 using the F1 line 6. The IF control unit 43 controls the F1 communication unit 42. The IF control unit 43 executes, for example, control such as a setup, addition, modification, and deletion (release) of the F1 line 6 with the CU 22. The RLC 44 executes, for example, processing of an RLC layer that executes processing such as retransmission control with the UE 3, overlap detection, and ordering (see T538.322). The MAC 45 executes, for example, processing of a MAC layer such as radio resource allocation, data mapping, and retransmission control (see TS38.321). The baseband processing unit 46, such as a processor, includes, for example, an analog baseband processing unit 46A that executes processing such as digital/analog (D/A) conversion, analog/digital (AID) conversion, and amplification, and a digital baseband processing unit 46B that executes, for example, processing such as modulation and coding (see T538.211 and T538.212). The analog baseband processing unit 46A includes a reception unit 51 and a transmission unit 52. The reception unit 51 is a processing unit that receives wireless signals such as user data between itself and the UE 3 via the antenna 41. The transmission unit 52 is a processing unit that transmits wireless signals such as user data between itself and the UE 3 via the antenna 41. Note that the BBU includes, for example, a SDAP, a PDCP, a RLC, a MAC, a digital baseband processing unit, and the like, and the RRH includes an analog baseband processing unit, an amplifier, and the like. Therefore, the combination of the BBU and the RRH and the combination of the CU 22 and the DU 21 have functions different from each other. Furthermore, the IF that connects the devices and the protocol to be used are also different.

The digital baseband processing unit 46B includes a generation unit 53, a coding/modulation unit 54, a demodulation/decoding unit 55, an extraction unit 56, and a measurement unit 57. The generation unit 53 generates measurement control information. The measurement control information includes measurement control information such as radio resources related to a SRS. The coding/modulation unit 54 encodes and modulates data signals, and transmits the modulated data signals to the transmission unit 52. The demodulation/decoding unit 55 demodulates/decodes the data signals received from the reception unit 51, and outputs the decoded data signals. The extraction unit 56 extracts control information from the decoded data signals, and outputs the extracted control information to the MAC 45. The measurement unit 57 measures uplink wireless channel quality with the UE 3 based on the reference signal (RS) in the decoded data signals, and outputs a measurement result of the uplink wireless channel quality to the MAC 45. Note that, for the RS, a sounding reference signal (SRS) is used among multiple types of RS (TS38.211). It is assumed that the reception unit 51, the demodulation/decoding unit 55, the extraction unit 56, and the measurement unit 57 form a reception processing unit 461. Furthermore, it is assumed that the generation unit 53, the coding/modulation unit 54, and the transmission unit 52 form a transmission processing unit 462. Note that it is also permissible if an uplink terminal individual RS is used.

The measurement unit 57 in the DU 21 measures the uplink wireless channel quality such as RS received quality (RSRQ) and RS received power (RSRP) using the SRS from the UE 3. Note that the UE 3 is to transmit the SRS according to a synchronization signal (SS) from the DU 21. The UE 3 adjusts, based on the synchronization signal and the timing information (timing advanced (TA)), the transmission timing of the SRS in consideration of a propagation delay in such a manner that a reception timing of uplink wireless signals from another UE 3 directed to the DU 21 matches.

The F1 communication unit 42 communicates (transmits and receives, or transfers) control information and user data with the CU 22 using the F1 line 6. Note that the user data to be transmitted through the F1 line 6 is a PDCP-PDU. The F1 communication unit 42 receives a measurement request for measuring the uplink wireless channel quality notified from the CU 22 through the F1 line 6, and measurement control information for performing the uplink wireless channel quality measurement notified from the CU 22 or notified from another DU 21 (e.g., measurement radio resource information to be used to transmit the SRS, information for generating the SRS, etc.). When its own device is in wireless communication with the UE 3, the transmission unit 52 generates measurement control information for measuring the uplink wireless channel quality, and transmits the generated measurement control information to the UE 3. Moreover, the F1 communication unit 42 notifies the another DU 21 of the generated measurement control information through the F1 line 6 via the CU 22. The measurement unit 57 measures, using the SRS from the UE 3, the uplink wireless channel quality with the UE 3 based on the measurement control information. The F1 communication unit 42 notifies the CU 22 of the measurement result of the uplink wireless channel quality of the measurement unit 57 using the F1 line 6.

Note that, although the case where the CU 22 is connected to two DUs 21 has been exemplified for convenience of explanation, it is not limited to the two DUs 21, and may be, for example, one or three or more, and may be changed as appropriate. Note that the gNB 4 may include a plurality of CUs 22 or a plurality of DUs 21. Furthermore, it is also permissible if the CU 22 and the DU 21 included in the gNB 4 are disposed at locations distant from each other.

Figure 4:
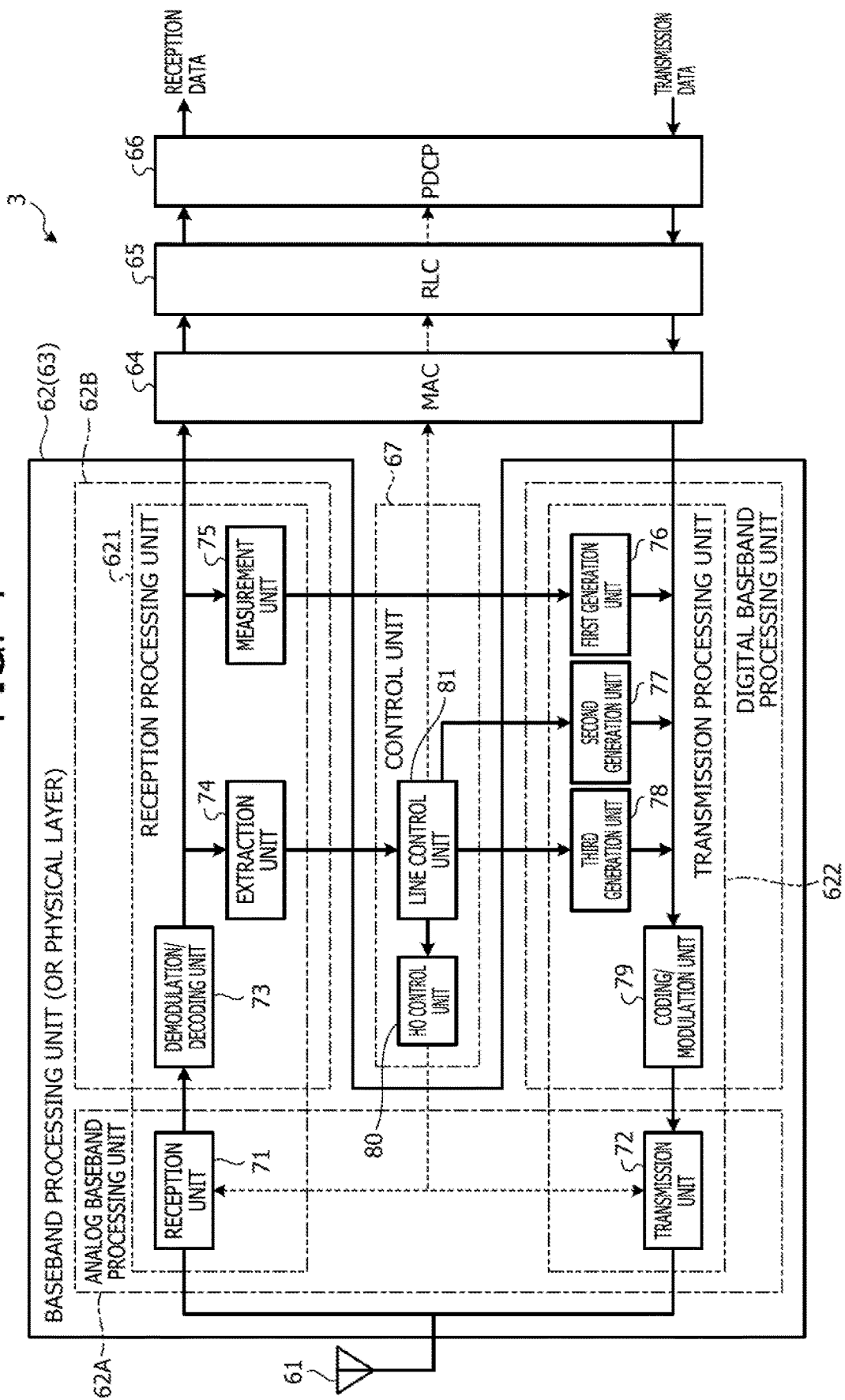
FIG. 4 is a block diagram illustrating an exemplary UE configuration.

FIG. 4 is a block diagram illustrating an exemplary configuration of the UE 3. The UE 3 illustrated in FIG. 4 includes an antenna 61, a baseband processing unit 62, a physical layer 63, a MAC 64, an RLC 65, a PDCP 66, and a control unit 67. The antenna 61 is a wireless antenna that wirelessly communicates with the DU 21 using a wireless channel. The physical layer 63 executes, for example, processing of a physical layer such as digital/analog (D/A) conversion, analog/digital (A/D) conversion, and amplification. The baseband processing unit 62 executes, for example, processing such as modulation and coding. The MAC 64 executes, for example, processing of a MAC layer such as data mapping and retransmission control. The RLC 65 executes, for example, processing of an RLC layer such as retransmission control, overlap detection, and ordering. The PDCP 66 executes, for example, processing of a PDCP layer such as data ordering, header compression, and encryption. The control unit 67 is, for example, a radio resource control (RRC) that executes processing such as transmission/reception control and HO control in accordance with radio resource allocation and the like from the gNB 4. The control unit 67 controls the entire UE 3. The control unit 67 controls the baseband processing unit 62, the physical layer 63, the MAC 64, the RLC 65, and the PDCP 66. The control unit 67 executes transmission processing of the uplink wireless channel on the basis of the radio resource, the modulation method, the coding rate, and the like notified from the gNB 4. Furthermore, the control unit 67 executes reception processing of the downlink wireless channel on the basis of the radio resource, the demodulation method, the decoding rate, and the like notified from the gNB 4.

The baseband processing unit 62 includes, for example, an analog baseband processing unit 62A that executes processing such as digital/analog (D/A) conversion, analog/digital (A/D) conversion, and amplification, and a digital baseband processing unit 62B that executes, for example, processing such as modulation and coding. The analog baseband processing unit 62A includes a reception unit 71 and a transmission unit 72. The reception unit 71 receives wireless signals between itself and the DU 21 through the antenna 61. The transmission unit 72 transmits wireless signals between itself and the DU 21 through the antenna 61.

The digital baseband processing unit 62B includes a demodulation/decoding unit 73, an extraction unit 74, a measurement unit 75, a first generation unit 76, a second generation unit 77, a third generation unit 78, and a coding/modulation unit 79. The demodulation/decoding unit 73 demodulates/decodes the received signals received from the reception unit 71, and outputs data signals. The extraction unit 74 extracts control information from the decoded data signals. The measurement unit 75 measures the downlink wireless channel quality with the DU 21 from the RS of the decoded data signals. The first generation unit 76 generates control information including the measurement result of the wireless channel quality from the measurement unit 75, and adds the control information to the transmission data from the MAC 64. The second generation unit 77 generates a SRS. Note that it is also permissible if the SRS is added to the transmission data. The third generation unit 78 generates control information. It is also permissible if the generated control information is added to the transmission data. Note that the control information is, for example, acknowledgement/negative-acknowledgement (ACK/NACK), a channel quality indicator (CQI), a rank indicator (RI), or a preceding matrix indicator (PMI), and may be subject to uplink transmission without being added to user data using a physical uplink control channel (PUCCH). Furthermore, it is also possible to add the control information to the user data and transmit it using a physical uplink shared channel (PUSCH). The coding/modulation unit 79 encodes and modulates transmission data, and transfers the modulated transmission data to the transmission unit 72. Note that the reception unit 71, the demodulation/decoding unit 73, the extraction unit 74, and the measurement unit 75 are assumed to form a reception processing unit 621. Furthermore, it is assumed that the first generation unit 76, the second generation unit 77, the third generation unit 78, the coding/modulation unit 79, and the transmission unit 72 form a transmission processing unit 622.

The control unit 67 includes a line control unit 81 and an HO control unit 82. The line control unit 81 controls, for example, the HO control unit 82 based on the control information. The HO control unit 82 controls, for example, hand over (HO) between the CUs 22 for the UE 3 and path switching between the DUs 21 under the same CU 22 for the UE 3. Note that the path switching between the DUs 21 is different from the HO in which cells are switched.

Figure 5:
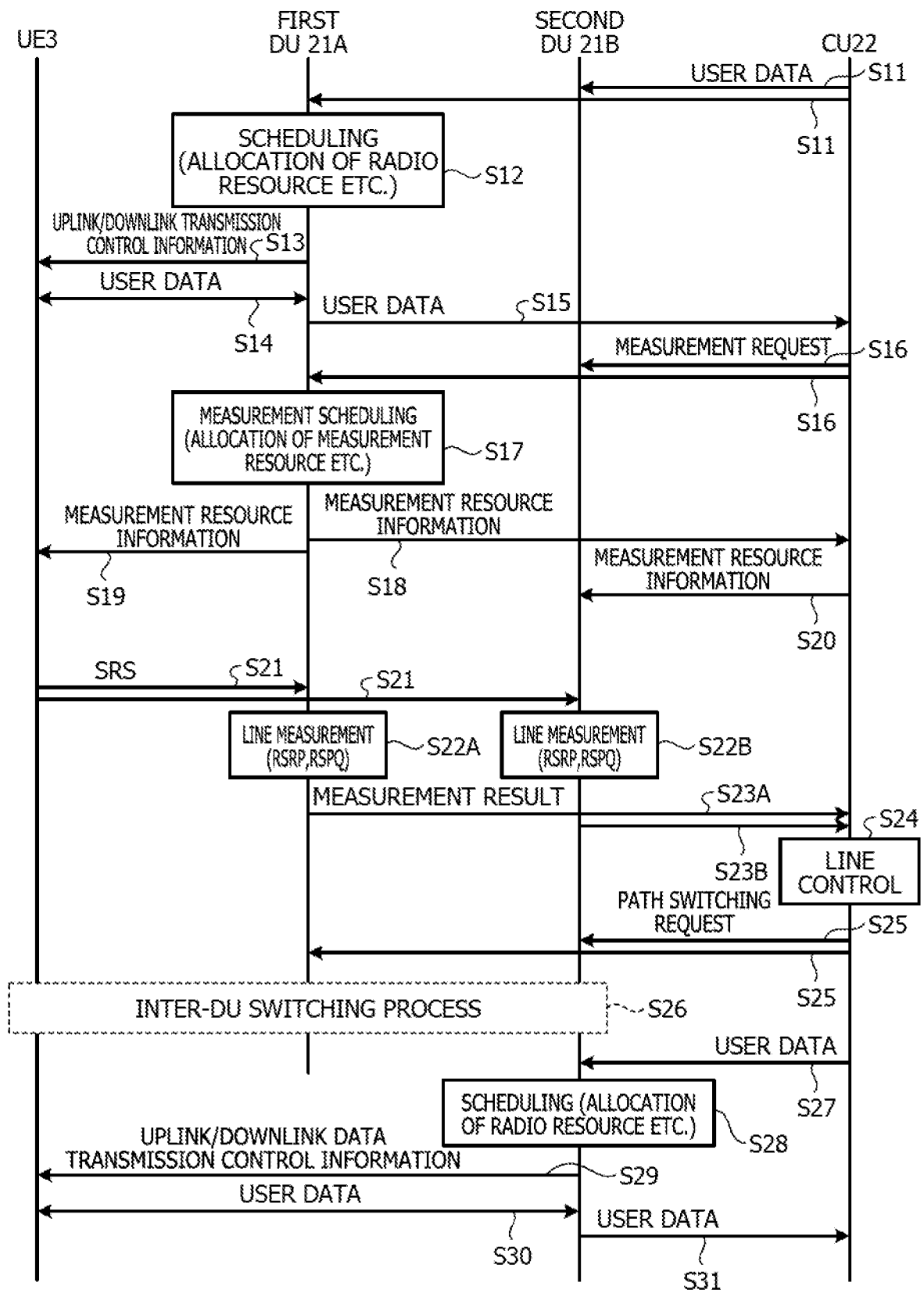
FIG. 5 is a sequence diagram illustrating exemplary processing operation related to an inter-DU switching process of the wireless communication system according to the first embodiment.

FIG. 5 is a sequence diagram illustrating exemplary processing operation related to an inter-DU switching process of the wireless communication system 1 according to the first embodiment. Note that, for convenience of explanation, it is assumed that the CU 22 transmits the same user data (PDCP PDU) to the first DU 21A and the second DU 21B, and the first DU 21A in wireless communication with the UE 3 transmits the user data to the UE 3 in the wireless communication system 1. The CU 22 in the gNB 4 transmits the user data (PDCP PDU) to the first DU 21A and the second DU 21B through the F1 line 6 (step S11). When the first DU 21A in wireless communication with the UE 3 receives the user data, it executes scheduling processing that allocates a radio resource to the UE 3 (step S12). The first DU 21A generates uplink/downlink data transmission control information, and transmits the generated uplink/downlink data transmission control information to the UE 3 (step S13). The UE 3 wirelessly communicates the user data with the first DU 21A on the basis of the uplink/downlink data transmission control information (step S14). When the first DU 21A receives user data using the F1 line 6, it transmits the user data to the CU 22 (step S15).

The CU 22 notifies the first DU 21A and the second DU 21B of a measurement request of the uplink wireless channel quality using the F1 line 6 (step S16). When the first DU 21A that wirelessly communicates with the UE 3 receives the measurement request from the CU 22, it executes scheduling processing that allocates a radio resource for SRS transmission to the UE 3 to be measured (step S17). Note that the scheduling processing generates measurement control information including information such as radio resources and transmission timing at the time of transmitting the SRS and the SRS sequence and parameters required at the time of generating the SRS. After executing the scheduling processing, the first DU 21A transmits the generated measurement control information to the CU 22 using the F1 line 6 (step S18). Moreover, the first DU 21A transmits the generated measurement control information to the UE 3 using the wireless channel (step S19). Moreover, when the CU 22 receives the measurement control information from the first. DU 21A using the F1 line 6, it transfers the measurement control information from the first DU 21A to the second DU 21B using the F1 line 6 (step S20).

Moreover, the UE 3 transmits the SRS using the wireless channel based on the measurement control information received in step S19 (step S21). The first DU 21A and the second DU 21B are to receive the SRS from the UE 3. The first DU 21A measures uplink wireless channel quality such as the RSRP and the RSPQ, for example, based on the SRS received from the UE 3 (step S22A). Similarly, the second DU 21B also measures uplink wireless channel quality such as the RSRP and the RSPQ, for example, based on the SRS received from the UE 3 (step S22B). Note that the SRS received by the first DU 21A and the second DU 21B is the same SRS transmitted by the UE 3 at a certain timing.

Moreover, the first DU 21A notifies the CU 22 of the measurement result of the uplink wireless channel quality in step S22A using the F1 line 6 (step S23A). Furthermore, the second DU 21B notifies the CU 22 of the measurement result of the uplink wireless channel quality in step S22B using the F1 line 6 (step S23B).

The CU 22 executes line control for switching the UE 3 to be measured to the DU 21 having the optimum uplink wireless channel quality based on the measurement result from the first DU 21A and the measurement result from the second DU 213 (step S24). The CU 22 notifies the first DU 21A and the second DU 21B of a path switching request in response to the execution of the line control (step S25). Note that, for convenience of explanation, the CU 22 determines that the uplink wireless channel quality of the second DU 21B is better than the uplink wireless channel quality of the first DU 21A based on the measurement result of the uplink wireless channel quality. In this case, the CU 22 transmits, to the first DU 21A and the second DU 213, a path switching request for switching the connection destination of the UE 3 to be measured from the first DU 21A to the second DU 2113.

The first DU 21A and the second DU 21B execute an inter-DU switching process for switching the wireless communication with the UE 3 from the first DU 21A to the second DU 21B in response to the path switching request (step S26). For example, the UE 3 switches the connection from the first DU 21A to the second DU 21B. Note that the path switching between the DUs 21 for the switching from the first. DU 21A to the second DU 21B is different from the HO that switches cells.

The CU 22 transmits the user data to the second DU 21B using the F1 line 6 (step S27). When an uplink radio resource request for the UE 3 to transmit the uplink user data or transmit user data from the CU 22 arrives, the second DU 21B executes the scheduling processing that allocates a radio resource of the UE 3 based on the uplink wireless channel quality measured by the second DU 213 or the downlink wireless channel quality measured by the UE 3 and notified to the DU 213 (step S28). Moreover, the second DU 21B generates uplink/downlink data transmission control information, and transmits the generated uplink/downlink data transmission control information to the UE 3 (step S29). Moreover, the UE 3 communicates the user data with the second DU 21B using the wireless channel on the basis of the uplink/downlink data transmission control information (step S30). When the second DU 21B receives uplink user data from the UE 3, it transmits the user data to the CU 22 using the F1 line 6 (step S31).

In a system that transmits the same user data to the subordinate first DU 21A and the second DU 21B using the F1 line 6, the CU 22 transmits a measurement request to the first DU 21A and the second DU 21B using the F1 line 6. The first DU 21A executes the scheduling processing for the UE 3 in wireless connection in response to the measurement request. The first DU 21A transmits, to the UE 3, control information (e.g., radio resource information to be used to transmit an SRS, and information for generating an SRS) for performing measurement of the uplink wireless channel quality using the wireless channel, and notifies the CU 22 of measurement control information for measuring the uplink wireless channel quality using the F1 line 6. Then, the CU 22 notifies (transfers) the second DU 21B of the measurement control information of the uplink wireless channel quality using the F1 line 6. As a result, the UE 3 generates an SRS based on the measurement control information, and transmits the generated SRS to the first DU 21A and the second DU 21B. Then, the first DU 21A and the second DU 21B are enabled to measure the uplink wireless channel quality with the UE 3 based on the SRS from the UE 3.

The scheduling is performed by a scheduler provided as a function of the MAC of each DU 21. In the uplink scheduling, the UE 3 to which uplink transmission is allowed is selected on the basis of the measurement result of the uplink wireless channel quality, and an uplink radio resource, a modulation method, a coding rate (coding method), and the like are selected to be used at the time of performing uplink transmission on the selected UE 3. Moreover, the selected UE 3 is notified of the selected modulation method, the coding rate, and the like using a downlink control channel. Similarly, also for the SRS, the UE 3 to which SRS transmission is requested is selected, and notifies it of control information for performing measurement of the uplink wireless channel quality using a terminal individual channel in a similar manner.

The scheduler is a MAC function of the CU 22. Therefore, the schedulers of the first DU 21A and the second DU 21B are different. For example, each of the schedulers has a different UE 3 that requests SRS transmission, and also has different measurement control information for performing measurement of the uplink wireless channel quality. Therefore, while the first DU 21A that has made the SRS transmission request to the UE 3 may easily measure the uplink wireless channel quality, another second DU 21B that has not made the SRS transmission request to the UE 3 does not know the measurement control information for performing measurement of the uplink wireless channel quality, whereby it is not possible to perform measurement of the uplink wireless channel quality using the SRS transmitted by the UE 3. In order for the second DU 21B to perform the measurement of the uplink wireless channel quality using the SRS transmitted by the UE 3, as described above, the first DU 21A notifies the second DU 21B of the information for identifying the UE 3 that has requested the SRS transmission and the measurement control information using the F1 line 6.

Moreover, it is also permissible if the second DU 21B allocates, to another UE 3, the radio resource to be used for the SRS transmission included in the measurement control information notified from the first DU 21A. For example, it is also permissible if a radio resource other than the radio resource notified to the another UE 3 is controlled (allocated or scheduled) not to interfere with the SRS transmission of the UE 3 having been notified. Alternatively, it is also permissible if it is controlled not to cause interference even in the case of being transmitted using the notified radio resource.

Moreover, the first DU 21A and the second DU 21B notify the CU 22 of the measurement result of the uplink wireless channel quality using the F1 line 6. The CU 22 executes, for the UE 3, a switching process between the DUs under the same CU 22 on the basis of the measurement results of the first DU 21A and the second DU 21B. As a result, the CU 22 controls the DU 21 to be connected with the UE 3 on the basis of the uplink wireless channel quality of the plurality of DUs 21 under the same CU 22.

The first DU 21A, the second DU 21B, and the CU 22 are physically separate devices, and are disposed geographically separately. Therefore, a first propagation path and a first propagation distance in the wireless communication between the first DU 21A and the UE 3 are different from a second propagation path and a second propagation distance in the wireless communication between the second DU 21B and the UE 3. Therefore, first wireless channel quality between the first DU 21A and the UE 3 is different from second wireless channel quality between the second DU 21B and the UE 3. For example, the uplink wireless channel quality measured by each DU 21 is different. Therefore, for example, the CU 22 selects the DU 21 having the best uplink wireless channel quality (in this case, it is assumed that the second uplink wireless channel quality measured by the second DU 21B is higher than the first uplink wireless channel quality measured by the first DU 21A), and notifies the second DU 21B to switch the connection destination from the first DU 21A to the second DU 21B. The CU 22 notifies the first DU 21A and the second DU 21B that the connection destination of the UE 3 is switched from the first DU 21A to the second DU 21B. Moreover, the CU 22 performs a switching process for switching the transmission destination of the downlink user data for the UE 3 from the first. DU 21A to the second DU 21B.

The second DU 21B that has received the downlink user data for the UE 3 from the CU 22 requests the UE 3 to measure the downlink wireless channel quality (or CQI), performs downlink scheduling on the basis of the downlink wireless channel quality (channel quality indicator (CQI)) notified from the UE 3, and wirelessly transmits, to the UE 3, downlink transmission control information such as a radio resource to be used at the time of transmitting user data to the UE 3 and the downlink user data. Furthermore, the second DU 21B requests the UE 3 to transmit the SRS, measures the uplink wireless channel quality based on the SRS transmitted from the terminal, performs uplink scheduling on the basis of the uplink wireless channel quality, and notifies the UE 3 of the uplink transmission control information such as a radio resource to be used when the UE 3 performs uplink transmission of the uplink user data. The UE 3 having received the uplink transmission control information transmits the uplink user data to the second DU 21B according to the uplink transmission control information.

Unlike the normal handover (HO), the inter-DU switching process does not require changing of the connection destination due to random access, and the DU 21 to be connected is switched without the side of the UE 3 being aware of it, thereby achieving the HO without any momentary interruption while the source of the PDCCH or the PDSCH is only switched. While the downlink wireless channel has a plurality of source DUs 21 and thus requires identification of the DU 21, the uplink wireless channel has only one source UE 3, whereby the SRS is terminal individual and is easily distinguished from another SRS, and the uplink wireless channel quality differs for each destination DU 21. Therefore, it becomes possible to select a DU 21 as long as it is an uplink wireless channel.

Furthermore, when the installation location of the DU 21 is different, the distance between the DU 21 and the UE 3 is different, whereby it is obvious that the uplink wireless channel quality measured by the DU 21A and the DU 21B is different. The CU 22 may select the DU 21 to be connected with the UE 3 by comparing the uplink wireless channel quality of the first DU 21A and the second DU 21B. Note that it is also permissible if hysteresis is set so that switching or a change of the DU 21 to be connected does not occur with a high frequency. It is possible to identify the DU 21 as long as the frequencies of the first DU 21A and the second DU 21B are different.

The CU 22 requests the DU 21 under the same CU 22 to measure the uplink wireless channel quality from the specified UE 3. When the DU 21 detects the measurement request, it notifies another DU 21 of the measurement control information including the radio resource of the SRS transmitted by the UE 3, information (or SRS) for SRS generation, and the like. Note that it is also permissible if a periodic SRS transmission request or a non-periodic SRS transmission request is added to the measurement control information. The UE 3 transmits the SRS with the radio resource allocated using the radio resource information. When the DU 21 receives the SRS, it executes measurement of the uplink wireless channel quality, and notifies the CU 22 of the measurement result. When the CU 22 receives the measurement result, it determines a switching destination DU 21 to communicate with the UE 3 on the basis of the measurement result. The CU 22 requests the connected DU 21 and the change destination DU 21 to perform path switching. Note that it is not limited to the SRS, and any other signals, such as RS, whose channel quality and the like can be obtained may be used, which may be changed as appropriate.

The CU 22 is enabled to perform a path switching process between areas using the same synchronization signal and SRS, that is, for example, between DUs 21. As a result, the UE 3 is enabled to connect to the DU 21 with satisfactory uplink wireless channel quality. In addition, it becomes possible to improve the transmission speed, the throughput, and the transmission delay of user data.

According to the first embodiment, in a system in which the CU 22 transmits the same user data to a plurality of DUs 21 and one DU 21 among the plurality of DUs 21 transmits the user data to the UE 3, the first DU 21A transmits the measurement control information to the second DU 21B and the UE 3. The first DU 21A and the second DU 21B measure the uplink wireless channel quality with the UE 3 based on the measurement control information and on the basis of the SRS from the UE 3, and notify the CU 22 of the measurement result. The CU 22 executes the inter-DU switching process on the basis of the measurement results of the first DU 21A and the second DU 21B. As a result, even in a case where the CU 22 transmits the same user data to a plurality of DUs 21 and one DU 21 among the plurality of DUs 21 transmits the user data to the UE 3, it becomes possible to connect to the DU 21 with high uplink wireless channel quality for the UE 3. In addition, it becomes possible to improve the transmission speed, the throughput, and the transmission delay of user data.

The DU 21 according to the first embodiment receives a measurement request from the CU 22, measures uplink wireless channel quality in response to the measurement request from the CU 22, and transmits the measurement result to the CU 22. Moreover, the DU 21 receives, from another DU 21, measurement control information at the time of measuring the uplink wireless channel quality via the CU 22. The UE 3 transmits the SRS to the DU 21 based on the measurement control information. As a result, the DU 21 is enabled to measure uplink wireless channel quality for each DU 21 under the same CU 22 on the basis of the measurement control information. For example, the first DU 21A that makes the SRS transmission request is naturally enabled to execute measurement of the uplink wireless channel quality with the UE 3, and the second DU 21B is also enabled to execute measurement of the uplink wireless channel quality with the UE 3.

The DU 21, which does not make the SRS transmission request, connects to the F1 line 6 connected to the CU 22, and receives the measurement control information from the CU 22 using the F1 line 6. As a result, the uplink wireless channel quality for the UE 3 may be measured even with the DU 21 that does not make the SRS transmission request.

In response to the measurement request from the CU 22, the DU 21 generates measurement control information for measuring the uplink wireless channel quality of the UE 3 when the DU 21 is in wireless communication with the UE 3. As a result, the DU 21 generates the measurement control information for the UE 3 in wireless communication.

The DU 21 generates measurement control information including the radio resource of the SRS to be used when the DU 21 measures the uplink wireless channel quality. As a result, the DU 21 is enabled to obtain the SRS from the UE 3.

The DU 21 generates measurement control information including the transmission timing of the SRS in which the DU 21 measures the uplink wireless channel quality. As a result, the DU 21 is enabled to receive the SRS from the UE 3.

In the first embodiment, the wireless communication system 1 in which the CU 22 transmits the same user data to a plurality of DUs 21 and one DU 21 transmits user data to the UE 3 has been exemplified. However, for example, it may also be a system in which the CU 22 transmits user data to only one DU 21 and the DU 21 transmits the user data to the UE 3, and an embodiment thereof will be described below as a second embodiment. Note that description of overlapping configurations and operations is omitted by providing the same reference signs to the same configurations as those of the first embodiment.

Second Embodiment

Figure 6:
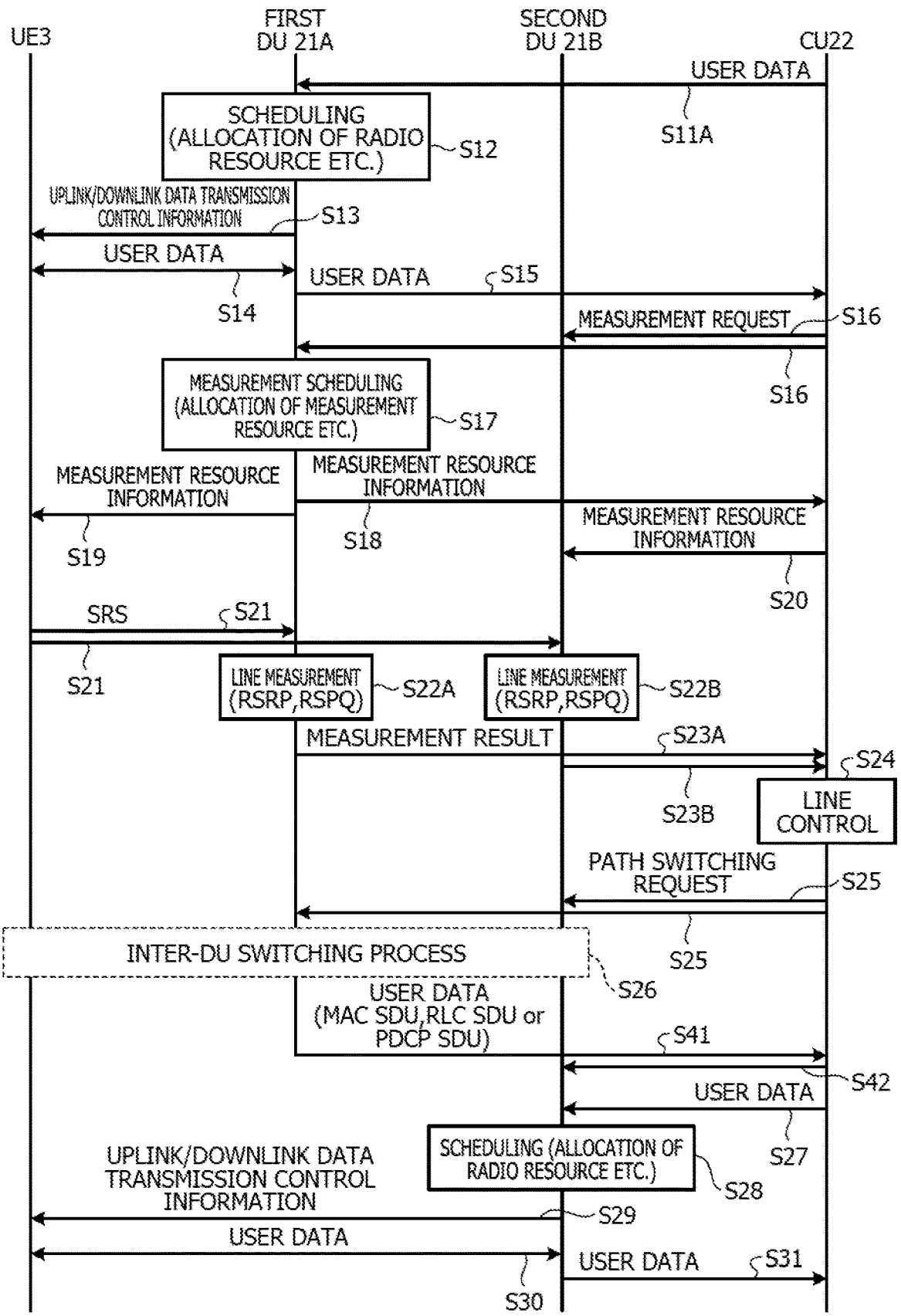
FIG. 6 is a sequence diagram illustrating exemplary processing operation related to an inter-DU switching process of a wireless communication system according to a second embodiment.

A wireless communication system 1 according to a second embodiment is a system in which a CU 22 transmits user data only to one DU 21, and the DU 21 transmits the user data to a UE 3. FIG. 6 is a sequence diagram illustrating exemplary processing operation related to an inter-DU switching process of the wireless communication system 1 according to the second embodiment.

The CU 22 transmits, using an F1 line 6, user data to a first DU 21A in wireless connection with the UE 3 (step S11A). When the first DU 21A receives the user data from the CU 22, it proceeds to step S12 to execute scheduling processing.

The first DU 21A transfers, after executing the inter-DU switching process in step S26, to the CU 22, the user data (MAC SDU, RLC SDU, and PDCP SDU) held before path switching (step S41). Note that the inter-DU switching process is assumed to execute a process of switching the connection from the first DU 21A in wireless connection with the UE 3 to a second DU 21B. When the CU 22 receives the user data (MAC SDU, RLC SDU, and PDCP SDU) from the first. DU 21A, it transfers the user data to the second DU 21B (step S42). Then, the CU 22 proceeds to step S27 to transmit the user data to the second DU 21B.

In the second embodiment, even in a case where the CU 22 transmits user data to one DU 21 and the DU 21 transmits the user data to the UE 3, the first DU 21A with which the UE 3 wirelessly communicates notifies the second DU 21B and the UE 3 of measurement control information. The first DU 21A and the second DU 21B measure uplink channel quality with the UE 3 based on the measurement control information and on the basis of an SRS from the UE 3, and notify the CU 22 of the measurement result. The CU 22 executes the inter-DU switching process based on the measurement results of the first DU 21A and the second DU 21B. As a result, even in a case where the CU 22 transmits user data to one DU 21 and the DU 21 transmits the user data to the UE 3, it becomes possible to obtain the uplink wireless channel quality of each DU 21 under the same CU 22. Moreover, the CU 22 may improve the channel quality by switching connection to the DU 21 optimum for the UE 3 on the basis of the uplink wireless channel quality for each DU 21 under the same CU 22.

The first DU 21A transfers, to the second DU 21B, untransmitted and/or undelivered user data and control information related to the user data via the CU 22. As a result, the second DU 21B, which is to be the switching destination in response to the path switching request, may achieve smooth path switching by inheriting the untransmitted and/or undelivered user data and the control information related to the user data with the UE 3.

The DU 21 according to the second embodiment receives a measurement request from the CU 22, measures uplink wireless channel quality in response to the measurement request from the CU 22, and transmits the measurement result to the CU 22. Moreover, the DU 21 receives, from the CU 22, the measurement control information to be used at the time of measuring the uplink wireless channel quality. As a result, the UE 3 transmits the SRS to the DU 21 based on the measurement control information. Then, the DU 21 is enabled to measure uplink wireless channel quality for each DU 21 under the same CU 22 based on the measurement control information. For example, the first DU 21A that makes the SRS transmission request is naturally enabled to execute measurement of the uplink wireless channel quality with the UE 3, and the second DU 21B is also enabled to execute measurement of the uplink wireless channel quality with the UE 3.

Third Embodiment

In the wireless communication system 1 according to the first and second embodiments, the DU 21 notifies another DU 21 of measurement control information via the CU 22. However, a transmission delay occurs due to the notification of the measurement control information via the CU 22. A transmission delay of user data may occur due to the transmission delay of measurement control information, whereby it may be difficult to meet the requirements of the maximum permissible retransmission delay and required transmission speed in URLLC and eMBB, for example.

Figure 7:
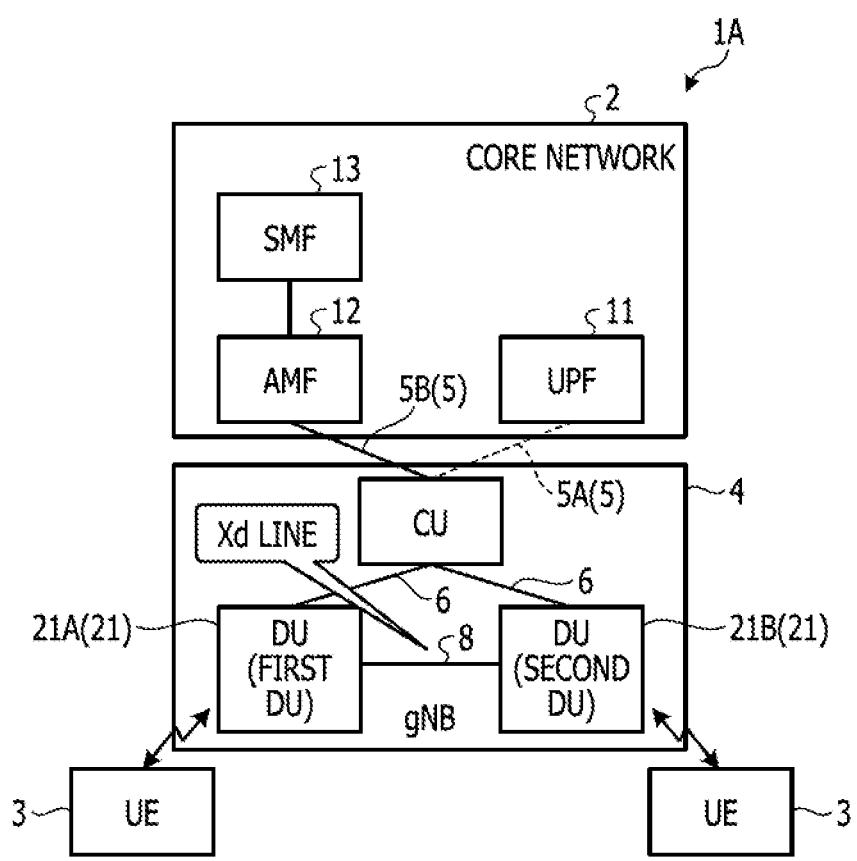
FIG. 7 is an explanatory diagram illustrating an exemplary wireless communication system according to a third embodiment.

In view of the above, an embodiment of a wireless communication system 1 capable of coping with such a situation will be described below as a third embodiment. Note that description of overlapping configurations and operations is omitted by providing the same reference signs to the same configurations as those of the wireless communication system 1 according to the first embodiment. FIG. 7 is an explanatory diagram illustrating an exemplary wireless communication system 1A according to the third embodiment. The wireless communication system 1A illustrated in FIG. 7 is different from the wireless communication system 1 illustrated in FIG. 1A in that a first DU 21A and a second DU 21B in the same gNB 4 are connected with each other via an Xd line 8 (inter-DU line or inter-wireless-device line, tentatively called an Xd line here). Note that it is also permissible if the first DU 21A and the second DU 21B are physically or directly connected, or logically or indirectly (via another device) connected.

Figure 8:
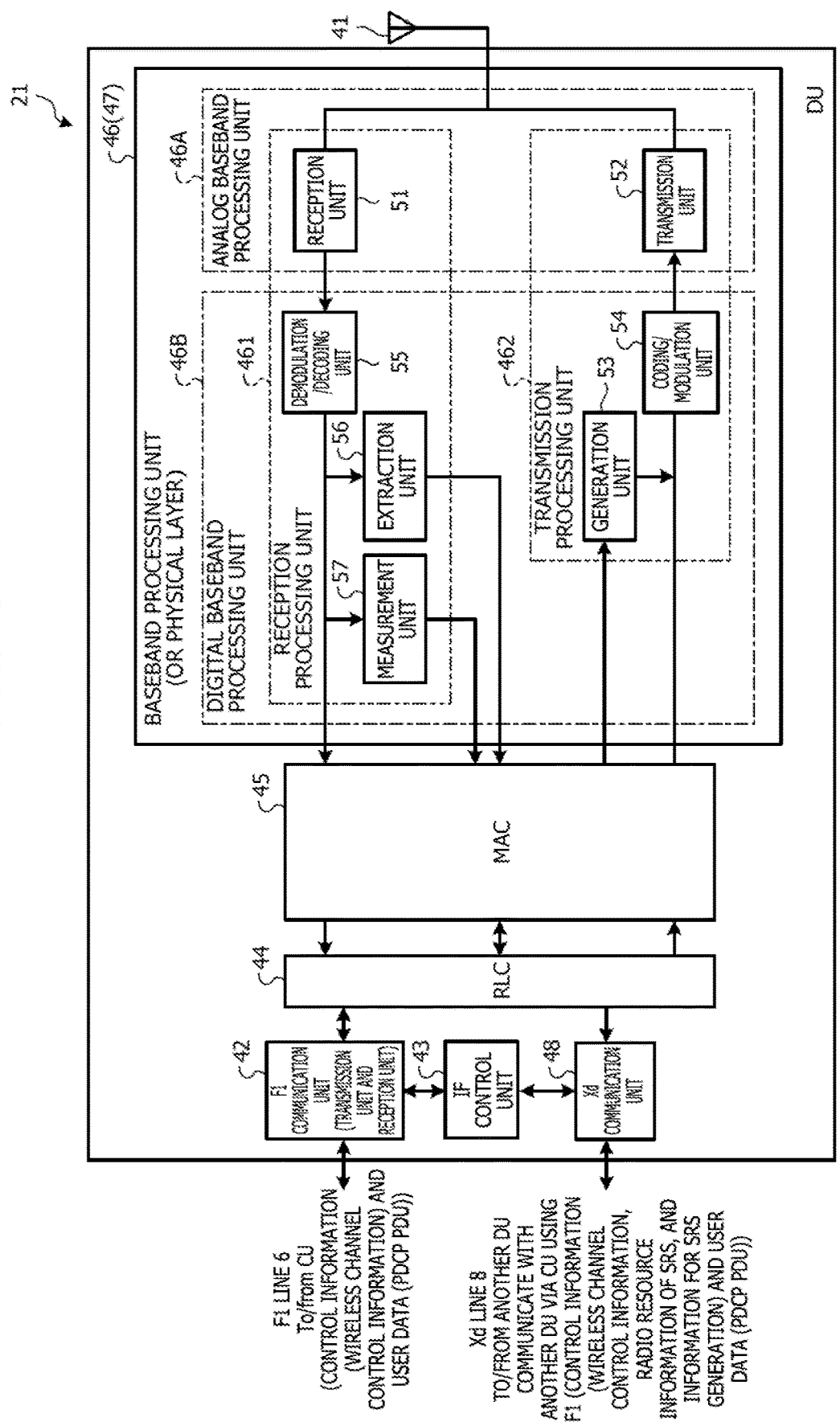
FIG. 8 is a block diagram illustrating an exemplary configuration of a DU in gNB according to the third embodiment.

FIG. 8 is a block diagram illustrating an exemplary configuration of the DU 21 according to the third embodiment. The DU 21 illustrated in FIG. 8 includes an Xd communication unit 48 to be connected to the Xd line 8 in addition to an antenna 41, an F1 communication unit 42, an IF control unit 43, an RLC 44, a MAC 45, a baseband processing unit 46, and a physical layer 47. The IF control unit 43 controls setup, changing, and the like of a line with another DU 21 using the Xd line 8. The IF control unit 43 performs, for example, control such as a setup, addition, modification, and deletion (release) of the F1 line 6 with the CU 22, and control such as a setup, addition, modification, and deletion of the Xd line 8 with the another DU 21. Note that it is also permissible if control of F1 and Xd is performed by separate IF control units. The Xd communication unit (or Xd interface) 48 communicates (transmit and receive, or transfer) control information and user data with the another DU 21 using the Xd line 8. The user data to be transmitted through the Xd line 8 is, for example, PDCP PDU, PDCP SDU, MAC PDU, or the like. The control information to be transmitted through the Xd line 8 includes a line control request and a transmission request. The line control request is, for example, a command that includes a line setup request in which the CU 22 requests a line setup of the Xd line 8, a line change request in which the CU 22 request a setting change of the Xd line 8, and a line release request in which the CU 22 requests a release of the Xd line 8. The transmission request is a command that requests transmission of the control information or user data between the DUs 21. The F1 communication unit 42 receives, using the F1 line 6, control information such as setup completion notification and release completion notification from the DU 21. Note that the setup completion notification is, for example, notification indicating setup completion in a case where the DU 21 sets the Xd line 8 with the another DU 21 in response to the line setup request. The release completion notification is notification indicating release completion in a case where the DU 21 releases the Xd line 8 with the another DU 21 in response to the line release request.

The F1 communication unit 42 receives, from the CU 22, the control information related to the line control request using the F1 line 6. The IF control unit 43 controls the Xd line 8 based on the line control request. When the line control of the Xd line 8 is completed by the IF control unit 43, the F1 communication unit 42 notifies the CU 22 of the line control completion using the F1 line 6. The transmission unit 52 wirelessly transmits, to the UE 3, the user data and the control information related to the transmission of the user data. The Xd communication unit 48 notifies the another second DU 21B of the user data and the control information using the Xd line 8.

The Xd communication unit 48 in the DU 21 receives the control information from the another DU 21 using the Xd line 8. The transmission unit 52 in the DU 21 wirelessly transmits, to the UE 3, the user data or user data different from the user data using a wireless channel. In the wireless communication with the first DU 21A or the second DU 21B, the UE 3 wirelessly transmits the user data and the control information related to the transmission of the user data.

The F1 communication unit 32 in the CU 22 requests the DU 21 under the same CU 22, for example, the second DU 21B under the same CU 22, to set up the Xd line 8. When the Xd communication unit 48 in the DU 21 detects the setup request of the Xd line 8 from the F1 line 6, it sets up the Xd line 8 using a message of the application protocol of the Xd line 8. Note that the setup of the Xd line 8 may be the same as the setup process of the F1 line 6 and an E1 line, for example (see TS38.473 (F1AP) and TS38.463 (E1AP)). Note that the E1 line is a line of an E1 interface in which the CU 22 is separated for a user plane and a control plane and connects a CU-UP and a CU-CP to be described later.

When the Xd line 8 is set, the F1 communication unit 42 in the DU 21 notifies the CU 22 of the completion of the line setup using the F1 line 6. The Xd communication unit 48 in the DU 21 notifies the another DU 21 of the user data and the control information including the measurement control information and the like using the Xd line 8. Note that the measurement control information is, for example, radio resource information of an SRS, control information for SRS generation, and the like. The F1 communication unit 42 in the CU 22 notifies the another DU 21 of the user data and control information including measurement control information and the like of the DU 21, and then requests each DU 21 to release the Xd line 8 through the F1 line 6. When the Xd communication unit 48 in each DU 21 detects the release request of the Xd line 8, it releases the Xd line 8. The F1 communication unit 42 of each DU 21 notifies the CU 22 of release completion notification indicating the release completion of the Xd line 8 using the F1 line 6.

Figure 9:
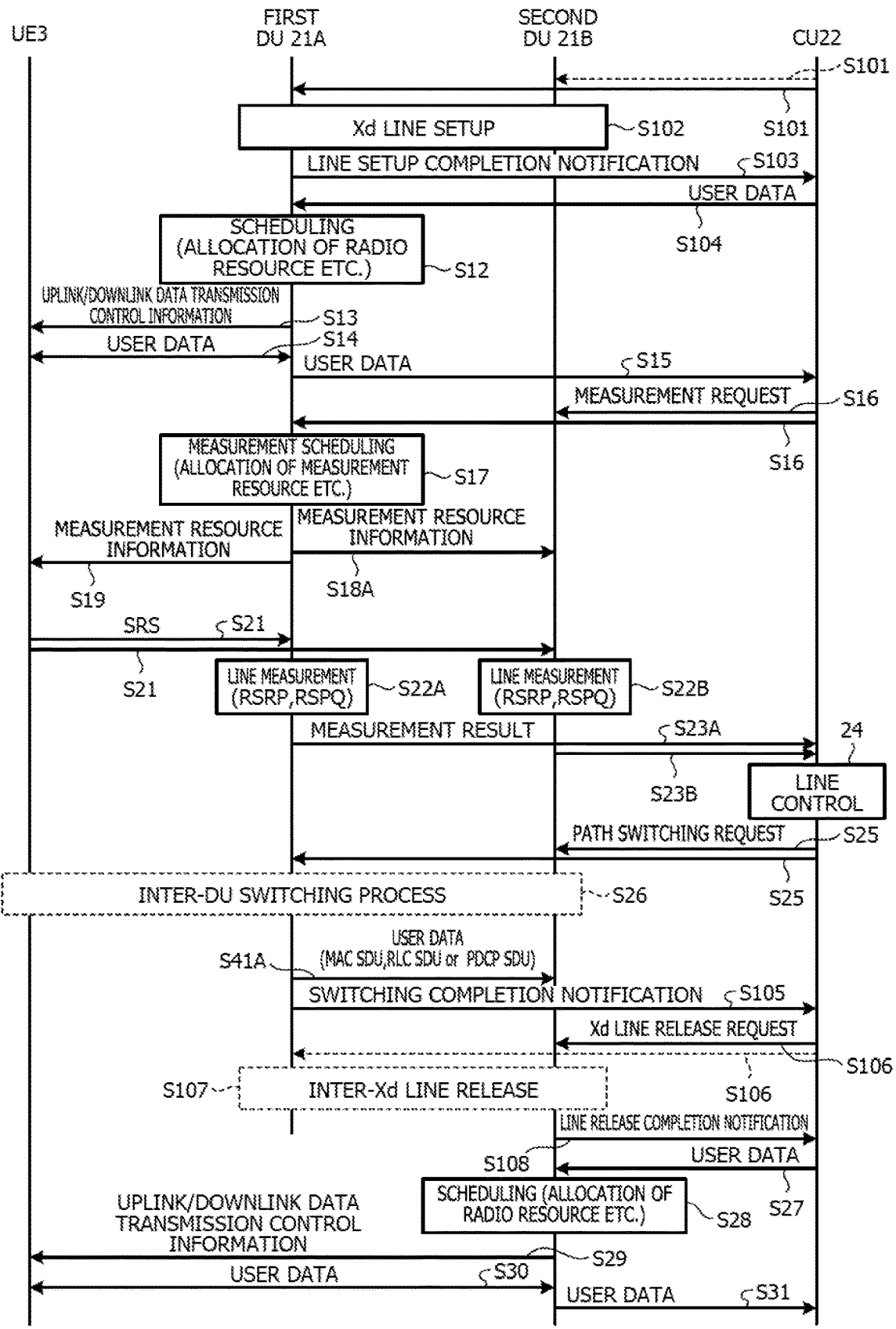
FIG. 9 is a sequence diagram illustrating exemplary operation related to an inter-DU switching process of the wireless communication system according to the third embodiment.

Next, operation of the wireless communication system 1A according to the third embodiment will be described. FIG. 9 is a sequence diagram illustrating exemplary processing operation related to an inter-DU switching process related to the wireless communication system 1A according to the third embodiment. The CU 22 notifies the first DU 21A and the second DU 21B of the line setup for setting the Xd line 8 between the first DU 21A and the second DU 21B using the F1 line 6 (step S101). The first DU 21A and the second DU 21B set up the Xd line 8 in accordance with the line setup from the CU 22 (step S102). The first DU 21A and the second DU 21B notify the CU 22 of the completion of the line setup of the Xd line 8 using the F1 line 6 (step S103).

When the CU 22 detects the completion of the line setup, it transmits the user data to the first DU 21A using the F1 line 6 (step S104). When the first DU 21A receives the user data, it proceeds to step S12 to execute the scheduling processing corresponding to the user data. Moreover, the first DU 21A generates measurement control information in the scheduling processing of step S17, and notifies the second DU 21B of the measurement control information using the Xd line 8 without going through the CU 22 (step S18A). As a result, the second DU 21B is enabled to directly receive the measurement control information from the first DU 21A using the Xd line 8, whereby it becomes possible to suppress the transmission delay of the measurement control information.

The first DU 21A and the second DU 21B execute a path switching process between the DUs 21 in response to a path switching request in step S26. For example, the UE 3 has switched the connection destination from the first DU 21A to the second DU 21B. Note that the path switching between the DUs 21 for the switching from the first DU 21A to the second DU 21B is different from the HO that switches cells. The first DU 21A executes the pass switching process in step S26, and then transfers the user data (MAC SDU, RLC SDU, and PDCP SDU) held before the path switching to the second DU 21B (step S41A).

The first DU 21A transfers the user data received from the CU 22 or the terminal UE 3 and accumulated in the first DU 21A to the second DU 21B, and then notifies, using the F1 line 6, the CU 22 of switching completion notification indicating that the path switching process is complete (step S105). When the CU 22 receives the switching completion notification, it notifies the first DU 21A and the second DU 21B of an Xd line release request using the F1 line 6 (step S106). When receiving the Xd line release request, the first DU 21A and the second DU 21B release the Xd line 8 between the first DU 21A and the second DU 21B (step S107). When the second DU 21B releases the Xd line 8, it notifies the CU 22 of line release completion notification using the F1 line 6 (step S108). Then, when the CU 22 receives the line release completion notification, it proceeds to step S27 to transmit the user data to the second DU 21B.

The DU 21 according to the third embodiment receives a measurement request from the CU 22, measures uplink wireless channel quality in response to the measurement request from the CU 22, and transmits the measurement result to the CU 22. Moreover, the DU 21 receives, from another DU 21, measurement control information to be used at the time of measuring the uplink wireless channel quality via the Xd line 8. As a result, the UE 3 is enabled to directly obtain the measurement control information and the like from the another DU 21 without going through the CU 22, whereby the transmission speed and transmission delay of the measurement control information may be improved. In addition, the DU 21 is enabled to measure uplink wireless channel quality for each DU 21 under the same CU 22 on the basis of the measurement control information.

In the wireless communication system 1A according to the third embodiment, it is possible to set the Xd line 8 between the DUs 21 led by the CU 22, whereby signaling and a data transfer time between the DUs 21 may be shortened using the Xd line 8 without going through the CU 22. As a result, the transmission speed and transmission delay of user data and control information may be improved.

The DU 21 connects to the Xd line 8 that connects to another DU 21, and receives measurement control information from the another DU 21 using the Xd line 8. As a result, the DU 21 is enabled to directly obtain the measurement control information and the like from the another DU 21 without going through the CU 22, whereby the transmission speed and transmission delay of the data may be improved.

Note that, in the wireless communication system 1A according to the third embodiment, an exemplary case where the Xd line 8 is set between the DUs 21 and the control information such as the measurement control information is transmitted between the DUs 21 has been described. However, the control information is not limited to the measurement control information, and for example, it is also permissible if data transmission between a plurality of the DUs 21 and the UE 3 (e.g., CoMPJT, site diversity, SHO, etc.) is transmitted, and may be changed as appropriate.

Furthermore, in the wireless communication system 1A according to the third embodiment, while an exemplary case where the CU 22 requests the setup of the Xd line 8 to the first DU 21A and the second DU 21B has been described, it is also permissible if the first DU 21A requests the setup of the Xd line 8 to the second DU 21B, for example, and may be changed as appropriate. Furthermore, at the time of installing the DU 21, the DU 21 requests the setup of the Xd line 8 to the adjacent. DU 21. It is also permissible if the first DU 21A requests the setup of the Xd line 8 to the second DU 21B in a case where the CU 22 sets a cell ID, and may be changed as appropriate.

In a similar manner to the E1 line that connects the CU-UP and the CU-CP to be described later, the Xd line 8 transmits control signals on the control plane and user data on the user plane. Note that the user data to be transferred is in units of RLC SDU, RLC PDU, MAC SDU, or MAC PDU. Furthermore, it is also permissible if control information such as scheduling information and SRS-related information (including. SRS (SRS string) itself) is transferred.

The Xd communication unit 48 makes it possible to convert the user data into a protocol such as GTP-U using the Xd line 8, and also makes it possible to convert the control information into a protocol such as SCTP using the Xd line 8.

Note that, while a single CU 22 that connects the AMF 12 and the UPF 11 has been exemplified in the wireless communication system 1 according to the first and second embodiments described above, it is also permissible if the CU 22 is separated into a CU-CP for the control plane and a CU-UP for the user plane. In view of the above, an embodiment thereof will be described below as a fourth embodiment.

Fourth Embodiment

Figure 10:
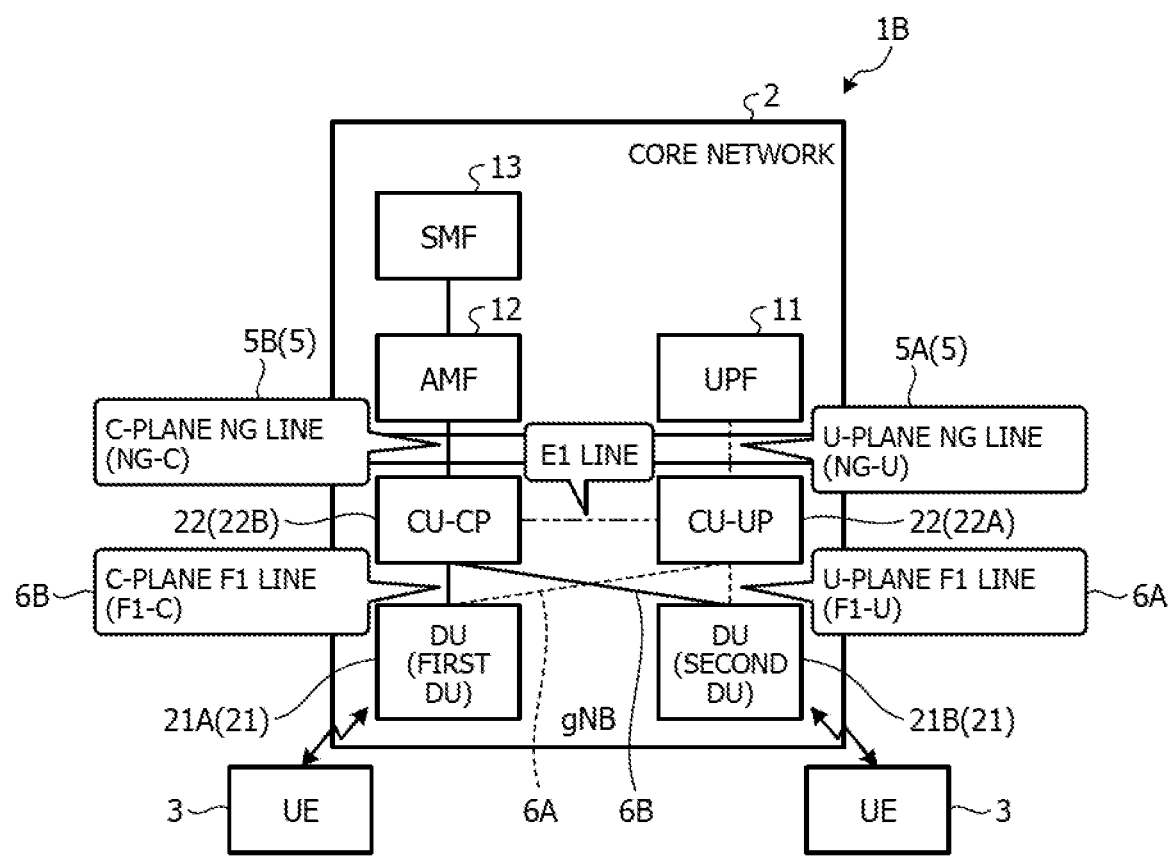
FIG. 10 is an explanatory diagram illustrating an exemplary wireless communication system according to a fourth embodiment.

FIG. 10 is an explanatory diagram illustrating an exemplary configuration of a wireless communication system 1B according to a fourth embodiment. Note that description of overlapping configurations and operations is omitted by providing the same reference signs to the same configurations as those of the wireless communication system 1 according to the first embodiment. A CU 22 of gNB 4 illustrated in FIG. 10 includes a CU-UP 22A that is a CU for a user plane, and a CU-CP 22B that is a CU for a control plane. The CU-UP 22A is connected to a UPF 11 with an NG line 5A for the user plane (U-plane NG line (NG-U)), and also connected to a first DU 21A and a second DU 218 with an F1 line 6A for the user plane (U-plane F1 line (F1-U)). The CU-CP 22B is connected to an AMF 12 with an NG line 5B for the control plane (C-plane NG line (NG-C)), and also connected to the first DU 21A and the second DU 21B with an F1 line 6B for the control plane (C-plane F1 line (F1-C)). An E1 line connects the CU-CP 22B and the CU-UP 22A.

Even in a case where the CU 22 is separated into the CU-UP 22A and the CU-CP 22B, the inter-DU switching process according to the first embodiment may be executed. The CU-CP 22B transmits a measurement request to the first DU 21A and the second DU 21B using the F1 line 6B. The first DU 21A executes scheduling processing for a UE 3 in wireless communication in response to the measurement request. The first DU 21A transmits measurement control information to the UE 3 using a wireless channel, and also notifies the CU-CP 22B of the measurement control information using the F1 line 6B. Then, the CU-CP 22B notifies the second DU 21B of the measurement control information using the F1 line 6B. As a result, the UE 3 transmits an SRS to the first DU 21A and the second DU 21B based on the measurement control information. Then, the first DU 21A and the second DU 21B are enabled to measure the uplink wireless channel quality with the UE 3 on the basis of the SRS from the UE 3. Note that the first DU 21A measures the uplink wireless channel quality on the basis of the SRS from the UE 3, and also the second DU 21B measures the uplink wireless channel quality based on the SRS from the UE 3 to the first DU 21A.

Moreover, the first DU 21A notifies the CU-CP 22B of the measurement result of the uplink wireless channel quality measured on the basis of the SRS from the UE 3 using the F1 line 6B. Moreover, the second DU 21B notifies the CU-CP 22B of the measurement result of the uplink wireless channel quality measured on the basis of the SRS from the UE 3 using the F1 line 6B. Note that the SRS received by the first DU 21A and the second DU 21B is the same SRS transmitted by the UE 3 at a certain timing. The CU-CP 22B executes, for the UE 3, a switching process between the DUs under the same CU 22 on the basis of the measurement results of the first DU 21A and the second DU 21B. As a result, the CU-CP 22B is enabled to measure the uplink wireless channel quality of each DU 21 among a plurality of the DUs 21 under the same CU 22. The UE 3 executes a switching process with another DU 21 under the same CU 22.

According to the fourth embodiment, in a system in which the CU-UP 22A transmits the same user data to a plurality of DUs 21 and one DU 21 among the plurality of DUs 21 transmits the user data to the UE 3, the first DU 21A transmits the measurement control information to the second DU 21B and the UE 3. The first DU 21A and the second DU 21B measure the uplink wireless channel quality with the UE 3 based on the measurement control information and on the basis of the SRS from the UE 3, and notify the CU-CP 22B of the measurement result. The CU-CP 22B executes the inter-DU switching process on the basis of the measurement results of the first DU 21A and the second DU 21B. As a result, even in a case where the CU-CP 22B transmits the same user data to a plurality of DUs 21 and one DU 21 transmits the user data to the UE 3, the wireless channel quality may be improved by switching the connection to the DU 21 optimum for the UE 3.

The DU 21 receives a measurement request from the CU-CP 22B, measures uplink wireless channel quality in response to the measurement request from the CU-CP 22B, and transmits the measurement result to the CU-CP 22B. Moreover, the DU 21 receives, from the CU-CP 22B, a part of the measurement control information to be used at the time of measuring the uplink wireless channel quality. As a result, the UE 3 transmits the SRS to the DU 21 based on the measurement control information. Then, the DU 21 is enabled to measure uplink wireless channel quality for each DU 21 under the same CU 22 based on the measurement control information.

Figure 11:
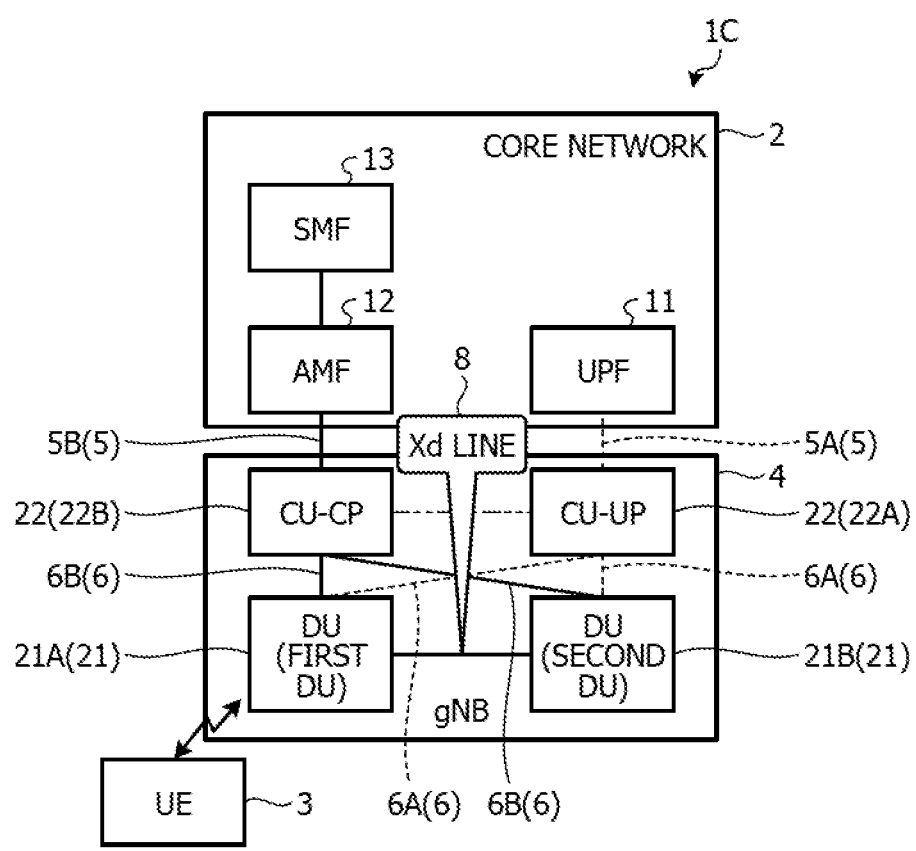
FIG. 11 is an explanatory diagram illustrating an exemplary wireless communication system according to a fifth embodiment.

Note that, while a single CU 22 that connects the AMF 12 and the UPF 11 has been exemplified in the wireless communication system 1A according to the third embodiment described above, it is also permissible if a CU in which the CU 22 is separated into the control plane and the user plane is used, and an embodiment thereof will be described below as a fifth embodiment. FIG. 11 is an explanatory diagram illustrating an exemplary configuration of a wireless communication system IC according to the fifth embodiment. Note that description of overlapping configurations and operations is omitted by providing the same reference signs to the same configurations as those of the wireless communication system 1A according to the third embodiment.

Fifth Embodiment

A CU 22 of gNB 4 illustrated in FIG. 11 includes a CU-UP 22A that is a CU for a user plane, and a CU-CP 22B that is a CU for a control plane. The CU-UP 22A is connected to a UPF 11 with an NG line 5A for the user plane, and is connected to a first DU 21A and a second DU 21B with an F1 line 6A for the user plane. The CU-CP 22B is connected to an AMF 12 with an NG line 5B for the control plane, and is connected to the first DU 21A and the second DU 21B with an F1 line 6B for the control plane.

For example, an Xd line 8 that transmits control information, user data, and the like is connected between the first DU 21A and the second DU 21B. An Xd communication unit 48 in the first DU 21A is connected to the Xd line 8. An Xd communication unit 48 in the second DU 21B is connected to the Xd line 8.

Even in a case where the CU 22 is separated into a CU-UP 220A and a CU-CP 220B, the inter-DU switching process according to the third embodiment may be executed. The DU 21 receives a measurement request from the CU-CP 22B using the F1 line 6B. The DU 21 measures uplink wireless channel quality in response to the measurement request from the CU-CP 22B, and transmits the measurement result to the CU-CP 22B. Moreover, the DU 21 receives, from another DU 21, measurement control information to be used at the time of measuring the uplink wireless channel quality via the Xd line 8. As a result, the UE 3 is enabled to directly obtain the measurement control information and the like from the another DU 21 without going through the CU-CP 22B, whereby the transmission speed and transmission delay of the measurement control information may be improved. In addition, the DU 21 is enabled to measure uplink wireless channel quality for each DU 21 under the same CU 22 on the basis of the measurement control information.

In a wireless communication system 1C according to the fifth embodiment, it is possible to set the Xd line 8 between the DUs 21 led by the CU-CP 22B, whereby signaling and a data transfer time between the DUs 21 may be shortened using the Xd line 8 without going through the CU-CP 22B. As a result, even in a case where the CU 22 is separated into the user plane and the control plane, the transmission speed and transmission delay of the user data may be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device configured to perform wireless communication with a terminal device, the communication device comprising:
a receiver configured to receive a measurement request from a wireless communication control device that is configured to control communication between the communication device and the terminal device;
a processor configured to measure uplink wireless channel quality with the terminal device in response to the measurement request; and
a transmitter configured to transmit a result of the measurement to the wireless communication control device, wherein
the receiver is configured to receive control information related to the measurement of the uplink wireless channel quality from at least one of the wireless communication control device and another communication device.

2. The communication device according to claim 1, wherein
a first cell identification information of a first cell configured by the communication device and a second cell identification information of a second cell configured by the another communication device are the same.

3. The communication device according to claim 1, wherein
the receiver is further configured to:
control a first line connected to the wireless communication control device, and
receive the control information related to the measurement of the uplink wireless channel quality from the wireless communication control device.

4. The communication device according to claim 1, wherein
the receiver is further configured to:
control a second line connected to the another communication device, and
receive the control information related to the measurement of the uplink wireless channel quality from the another communication device.

5. The communication device according to claim 1, wherein
the processor is configured to generate the control information related to the measurement of the uplink wireless channel quality.

6. The communication device according to claim 1, wherein
the receiver is configured to receive, from the wireless communication control device, a switching request that switches a wireless connection with the terminal device from the communication device to another communication device, and
the transmitter is configured to transfer, to the another communication device, user data that has not been transmitted to the terminal device.

7. The communication device according to claim 1, wherein
the control information related to the measurement of the uplink wireless channel quality includes control information related to a radio resource of an uplink reference signal.

8. The communication device according to claim 1, wherein
the control information related to the measurement of the uplink wireless channel quality includes control information related to a transmission timing of an uplink reference signal.

9. A communication method which is performed by a communication device, the communication device is configured to perform wireless communication with a terminal device, the communication method comprising:
receiving a measurement request from a wireless communication control device that is configured to control communication between the communication device and the terminal device, the measurement request related to an uplink wireless channel quality with the terminal device;
receiving control information related to the measurement of the uplink wireless channel quality from at least one of the wireless communication control device and another communication device;
measuring the uplink wireless channel quality with the terminal device; and
transmitting a result of the measurement to the wireless communication control device.

10. A communication control device configured to control communication between a communication device and a terminal device, the communication control device comprising:
a transmitter configured to transmit control information related to a measurement of wireless channel quality to another communication device, the wireless channel quality corresponding to an uplink wireless channel quality of the terminal device; and
a receiver configured to receive a result of a measurement of the uplink wireless channel quality from the communication device and the another communication device, wherein
the transmitter is configured to transmit, to at least one of the communication device and the another communication device, a switching request that switches connection with the terminal device from wireless communication with the communication device to wireless communication with the another communication device.

11. The communication control device according to claim 10, wherein
a first cell identification information of a first cell configured by the communication device and a second cell identification information of a second cell configured by the another communication device are the same.

12. A base station comprising:
a communication device configured to perform wireless communication with a terminal device; and
a communication control device configured to control communication between the communication device and the terminal device, wherein the communication device is further configured to:
receive a measurement request from the communication control device,
measure uplink wireless channel quality with the terminal device, and
transmit a result of the measurement to the communication control device,
wherein the communication control device is further configured to:
receive control information related to the measurement of the uplink wireless channel quality from at least one of the communication control device and another communication device,
transmit the control information related to a measurement of the uplink wireless channel quality to another communication device,
receive the result of the measurement of the uplink wireless channel quality from the communication device and the another communication device, and
transmit, to at least one of the communication device and the another communication device, a switching request that switches connection with the terminal device in wireless communication from the communication device to another communication device.

13. The base station according to claim 12, wherein
a first cell identification information of a first cell configured by the communication device and a second cell identification information of a second cell configured by the another communication device are the same.

* * * * *